(12) United States Patent
Huang et al.

(10) Patent No.: US 8,447,326 B2
(45) Date of Patent: May 21, 2013

(54) SELECTIVE LOCATION DETERMINATION

(75) Inventors: Ronald Keryuan Huang, Milpitas, CA (US); Isabel Ge Mahe, Los Altos, CA (US); Puneet Mishra, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 314 days.

(21) Appl. No.: 12/851,500

(22) Filed: Aug. 5, 2010

(65) Prior Publication Data

US 2011/0250903 A1   Oct. 13, 2011

Related U.S. Application Data

(60) Provisional application No. 61/321,838, filed on Apr. 7, 2010.

(51) Int. Cl.
*H04W 64/00* (2009.01)

(52) U.S. Cl.
USPC .......................... 455/456.1; 370/338

(58) Field of Classification Search
USPC ......................... 455/456.1; 370/338
See application file for complete search history.

(56) References Cited

U.S. PATENT DOCUMENTS

| | | | |
|---|---|---|---|
| 5,945,948 A * | 8/1999 | Buford et al. | 342/457 |
| 7,627,545 B2 | 12/2009 | Asher et al. | |
| 2005/0096991 A1 | 5/2005 | Main, II et al. | |
| 2006/0089157 A1* | 4/2006 | Casey et al. | 455/456.3 |
| 2006/0240840 A1* | 10/2006 | Morgan et al. | 455/456.1 |
| 2009/0102712 A1* | 4/2009 | Heffez | 342/357.06 |
| 2009/0177643 A1 | 7/2009 | Gupta et al. | |
| 2010/0073229 A1 | 3/2010 | Pattabiraman et al. | |

FOREIGN PATENT DOCUMENTS

WO   WO 2005/088991   9/2005

* cited by examiner

*Primary Examiner* — Marcos Batista
(74) *Attorney, Agent, or Firm* — Fish & Richardson P.C.

(57) ABSTRACT

Methods, program products, and systems for selective location determination are described. A mobile device can determine a location of the mobile device using various techniques. When there is a conflict between the locations determined using different techniques, the mobile device can select a most trustworthy location from the locations, and designate the most trustworthy location as a current location of the mobile device. The mobile device can determine a first location of the mobile device (e.g., a coarse location) using a cell identifier (cell ID) of a cellular network. The mobile device can determine a second location of the mobile device (e.g., a fine location) using one or more media access control (MAC) addresses of a WLAN. The first location and second location can be associated with confidence values that can indicate trustworthiness of the first location and second location.

33 Claims, 13 Drawing Sheets

SELECTIVE LOCATION DETERMINATION

CROSS-REFERENCE TO RELATED APPLICATIONS

This application claims the benefit under 35 U.S.C. §119 (e) of U.S. Provisional Application Ser. No. 61/321,838, filed on Apr. 7, 2010.

TECHNICAL FIELD

This disclosure relates generally to determining a location of a mobile device.

BACKGROUND

A modern mobile device can incorporate functions of a computer, of a cellular transceiver, or a wireless (e.g., WiFi™) transceiver. For example, the mobile device can perform traditional computer functions, such as executing application programs, storing various data, and displaying digital images. These functions can be performed in an application subsystem of the mobile device. The application subsystem can include an application processor, an application operating system, and various input/output devices.

When the mobile device functions as a cellular transceiver, the mobile device can initiate and receive phone calls, send and receive data over a cellular network, identify cellular tower connections, and determine when and whether to switch cellular towers. Similarly, the mobile device can function as a wireless radio transceiver and send and received data over a wireless network, e.g. a WiFi™ network. These radio-related functions can be performed in a baseband subsystem of the mobile device. The baseband subsystem can include a baseband processor and a baseband operating system. The baseband processor can be an integrated circuit (IC) device (e.g., a Large Scale Integrated Circuit (LSI)) that performs communication functions. The baseband processor can include, for example, a Global System for Mobile Communications (GSM) modem. The baseband processor can be can be integrated with the application processor in a System-on-Chip (SoC).

SUMMARY

Methods, program products, and systems for selective location determination are described. A mobile device can determine a location of the mobile device using various techniques. When there is a conflict between the locations determined using different techniques, the mobile device can select a most trustworthy location from the locations, and designate the most trustworthy location as a current location of the mobile device. The mobile device can determine a first location of the mobile device, which can be a coarse location determined using a cell identifier (cell ID) of a cellular network. The mobile device can determine a second location of the mobile device, which can be a fine location determined using one or more media access control (MAC) addresses of one or more access points of a wireless local area network (WLAN). The first location and second location can be associated with confidence values that can indicate trustworthiness of the first location and second location.

The confidence value of the first location can be determined on a server. The server can include a location data store that stores location identifiers (e.g., cell IDs), locations corresponding to the location identifiers, and confidence values corresponding to the locations. The server can determine the location for a location identifier using raw locations received from location-aware mobile devices that are associated with the location identifier (e.g., mobile devices using a cell ID). The server can determine a confidence value corresponding to the location based on a population of the raw locations, a stability of the location, a longevity of the location, and a freshness of the raw locations.

The mobile device can determine the second location using locations of access points that are within a communication range of the mobile device. The mobile device can request and receive location information of the access points, locations of other access points in a WLAN cell in which the access points are located, and locations of access points in WLAN cells neighboring the WLAN cell. The mobile device can identify a WLAN location of the mobile device using the received location information and MAC addresses of the access points that are within a communication range of the mobile device.

Techniques of selective location determination can be implemented to achieve the following example advantages. A mobile device can determine a location of the mobile devices using various reference points (e.g., cell towers of a cellular communications network or access points of a WLAN) and locations stored in association with location identifiers (e.g., identifiers of the reference points). Each of the reference point can move. For example, a cell ID of a cell tower in one state or country can be reused for a cell tower in another state or country. One or more access points can relocate (e.g., during a company relocation). If a reference point moves, the location identifier associated with the reference point can become invalid, resulting in errors in result of the location determination. Using selective location determination, the mobile device can select a location that is determined using the most trustworthy reference points, thus maximizing accuracy of the location determination.

The details of one or more implementations of selective location determination are set forth in the accompanying drawings and the description below. Other features, aspects, and advantages of selective location determination will become apparent from the description, the drawings, and the claims.

BRIEF DESCRIPTION OF THE DRAWINGS

Like reference symbols in the various drawings indicate like elements.

DETAILED DESCRIPTION

Overview of Selective Location Determination

Figure 1:
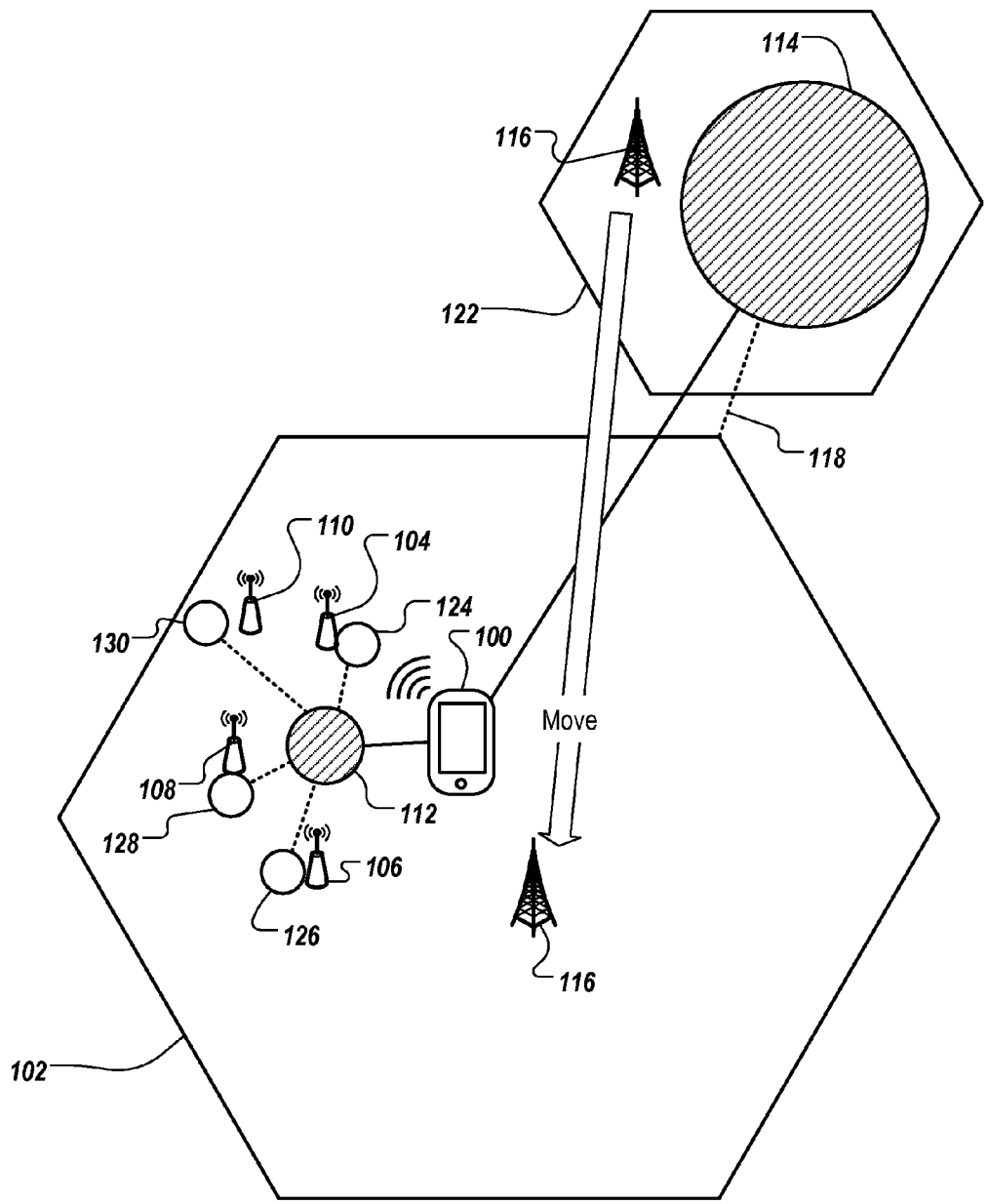
FIG. 1 is an overview of techniques of selective location determination.

FIG. 1 is an overview of techniques of selective location determination. Mobile device 100 can be a mobile device that implements the techniques of selective location determination. Mobile device 100 can be located in current cell 102 of a cellular communication network, and within communication range of wireless access points 104, 106, 108, and 110 of a WLAN.

Mobile device 100 can detect a cell ID of current cell 102 using a baseband subsystem of mobile device 100. Mobile device 100 can use the detected cell ID to query a cell location data store that stores cell IDs and cell locations corresponding to the cell ID. Using the detected cell ID, mobile device 100 can determine a cell location of cell 102 by performing a look up in the cell location data store to identify a corresponding cell location (e.g., cell location 114). The correspondence between cell location 114 and cell 102 is represented by dotted line 118. Cell location 114 can be a location calculated statistically based on usage information, e.g., location of mobile devices that are, or have been, connected to cell tower 116. Cell location 114 need not correspond precisely to a size or shape of an actual cell.

In the example of FIG. 1, cell location 114 does not accurately describe a geographic location of cell 102. The inaccuracy can be caused by a recent move of equipment (e.g., a transceiver identified by the cell ID) of cell tower 116 from cell 122 to cell 102. Due to various reasons (e.g., latency in updating the cell location data store, etc.), using the cell ID detect from the baseband subsystem and the information stored in the cell location data store, mobile device 100, determines (incorrectly) that mobile device is located at a first location (e.g., cell location 114).

Mobile device 100 can detect one or more MAC addresses of access points 104, 106, 108, and 110 in a WLAN using a WLAN subsystem of mobile device 100. Access points 104, 106, 108, and 110 can be located within a communication range of mobile device 100, and can be, but are not required to be, connected to mobile device 100 wirelessly. An access point is located within a communication range of mobile device 100 when wireless signals sent from one party (e.g., mobile device 100) during communications between mobile device 100 and the access point can be received with sufficient signal to noise ratio by the other party (e.g., the access point).

Using the detected MAC addresses, mobile device 100 can determine a second location of mobile device 100. Mobile device 100 can include an access point location data store that stores MAC addresses and access point locations corresponding to the MAC addresses. An access point location can be a location of an access point that is determined statistically from usage data of the access point, e.g., by using locations of mobile devices that are, or have been, located within communication range of the access point. The access point location need not correspond precisely to the actual geographic location of the access point. Using the detected MAC addresses, mobile device 100 can identify one or more access point locations (e.g., access point locations 124, 126, 128, and 130) associated with the MAC addresses by performing a look up in the access point location data store using the detected MAC addresses. Using the identified access point locations 124, 126, 128, and 130, mobile device 100 can determine WLAN location 112 by performing triangulation or other heuristic location calculations. WLAN location 112 can be the second location of mobile device.

If the first location (e.g., cell location 114) and the second location (e.g., WLAN location 112) completely overlap (e.g., one location completely encloses another) or partially overlap (e.g., one location partially intersects another), the first location and the second location can confirm each other. Mobile device 100 can designate the location that has a smaller error margin (e.g., WLAN location 112) as a current location of mobile device 100.

If the first location and the second location conflict with each other (e.g., when the first location and the second location have no intersection), mobile device 100 can select one of the first location and the second location and designate the selected location as the current location of mobile device 100. The selection can be based on confidence values associated with the first location and the second location.

Cell location 114 of cell 102, as well as a confidence value associated with cell location 114, can be determined on a server, on a mobile device (e.g., mobile device 100), or on a distributed system that includes various data processing apparatus. For convenience, determining cell location 114 and the confidence value will be described with respect to a server that makes the determination. The confidence value can be stored in the cell location data store.

To select a most trustworthy location, mobile device 100 can compare the confidence value associated with cell location 114 with a confidence value associated with WLAN location 112. Confidence value associated with WLAN location 112 can be determined using a specified base value and a number of wireless access points detected by mobile device 100. The specified base value can be a value (e.g., "50") that is associated with WLAN location 112 as long as WLAN location 112 can be extrapolated. Each of the wireless access points (e.g., access points 104, 106, 108, and 110) can be associated with a weight (e.g., "2"). In some implementations, the confidence value associated with WLAN location 112 can be the specified base value plus the number of access points times the weight.

If WLAN location 112 is associated with a confidence value that is greater than the confidence value associated with cell location 114 and cell 102, WLAN location 112 can trump cell location 114. Mobile device 100 can select WLAN location 112 and designate WLAN location 112 as the current location of mobile device 100. If WLAN location 112 is associated with a confidence value that is less than or equal to the confidence value associated with cell location 114, mobile device 100 can designate cell location 114 as the current location of mobile device 100.

The confidence value associated with cell location 114 can be calculated based on usage information of cell tower 116. Calculating confidence value for cell location 114 will be described in further detail below. In the example of FIG. 1, cell location 114 can be associated with a confidence value of 65 (e.g., on a 0-100 scale). If mobile device 100 can identify eight access points based on which mobile device 100 can determine the WLAN location, mobile device 100 can designate WLAN location 112 as the current location of mobile 100, because the confidence value of WLAN location 112 is 66. If mobile device 100 can identify only seven access points, the confidence value of WLAN location 112 is 64. Consequently, mobile device 100 can designate cell location 114 as the current location of mobile device 100 since cell location 114 has a greater confidence value.

A server can determine cell location 114 by extrapolating raw locations received on the server. The raw locations can be submitted from one or more location-aware mobile devices. A raw location can be a location determined by a location-aware mobile device. The raw location can include a longitude, a latitude, optionally an altitude, and an error margin. The location-aware mobile devices can determine the raw locations using various technologies. For example, a location-aware mobile device can determine its raw location by using selective location determination as described, by triangulating locations of wireless access points or cell towers, or by using a global positioning system (e.g., GPS). The raw location can be associated with a cell ID (e.g., cell ID associated with cell tower 106) of a cellular communication network when, at the time the raw location is determined, the mobile device determining the location is in the cell (e.g., served by cell tower 106) identified by the cell ID. The location-aware mobile device can be connected to cell tower 106, or be assigned the cell ID of cell tower 106 by the cellular network without being connected to cell tower 106.

The location-aware mobile device can transmit the raw location and the cell ID of cell tower 106 to the server at the time the raw location is determined, or at another time. For example, the transmission can occur when the location-aware mobile device establishes a data connection with the server upon a user request. The server can receive the raw location and the cell ID of cell tower 106 transmitted from the mobile device, and associate the raw location with the cell ID of cell tower 106 as a cell location. If multiple raw locations associated with the cell ID of cell tower 106 are received, the server can extrapolate the cell location, for example, by averaging the received raw locations, excluding extreme points of the received raw locations, and determining an error margin. In general, a single raw location associated with the cell ID of cell tower 106 can determine a cell location of cell tower 106. The more raw locations the server receives that are associated with the cell ID of cell tower 106, the more reliable the extrapolated cell location. The server can assign a high confidence value (e.g., "100" on a 0-100 scale) to indicate a high reliability.

The server can adjust the confidence value using various factors. In addition to using number of raw locations received, also referred to as a population of raw locations, the server can additionally or alternatively determine the confidence value using a longevity of the cell ID of cell tower 106 (e.g., a length of time that the cell ID has been associated with a cell location), a stability of the cell ID of cell tower 106 (e.g., a length of time that the location has remained substantially unchanged), and a freshness of the locations (e.g., a length of time since the server received a last location update from a mobile device). The confidence value can be proportional to one of or a combination of two or more of confidence factors (e.g., population, stability, longevity, and freshness). In some implementations, a combination of multiple confidence factors can be given more weight in determining the confidence value. Cell location 114 can have a relatively low confidence value, for example, when cell tower 106 recently moved from cell 122 to cell 102 (location unstable), or when cell tower 106 has remained inactive for a period of time during the move (received locations stale).

Cell location 114, access point locations 124, 126, 128 and 130, and WLAN location 112 are represented as circular areas in FIG. 1 and subsequent figures. The circular area can each have a center that can be represented by coordinates that can include a latitude, a longitude, and optionally, an altitude. A radius of the circular area can represent an error margin of a location, which can indicate a degree of uncertainty of where a mobile device is actually located. The centers and radii of cell location 114 and WLAN location 112 can be determined in various ways, as will be described in further detail below.

Cell location 114, access point locations 124, 126, 128 and 130, and WLAN location 112 can have various geometric shapes (e.g., an ellipse, a polygon, or a random geometric shape). The center of the various geometric shapes can be a centroid, a mean center, a center of a minimum bounding rectangle (MBR) of the random shape, a center of a smallest circle that completely encloses the random shape, a center of a largest inscribed circle of the random shape, or a center defined using any geometric or statistic (e.g., Monte Carlo) method.

The cell location data store and the access point location data store can be hosted on mobile device 100, or remotely on the server, and downloaded to mobile device 100 periodically through a data push from the server, or upon a request from mobile device 100. The locations of various access points can be calculated using techniques described below with respect to FIGS. 2A and 2B.

Figure 2A:
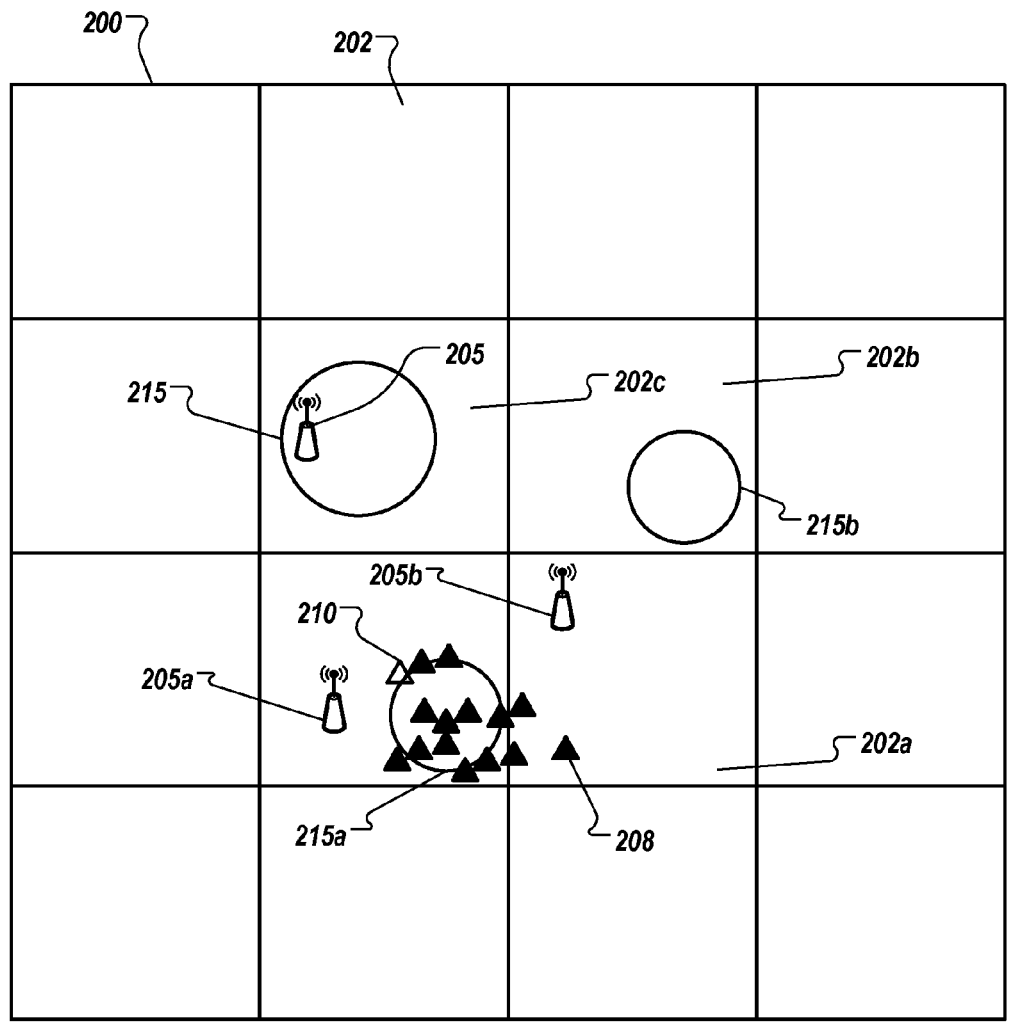
FIGS. 2A-2B illustrate example techniques of determining an access point location from one or more raw locations.
Figure 2B:
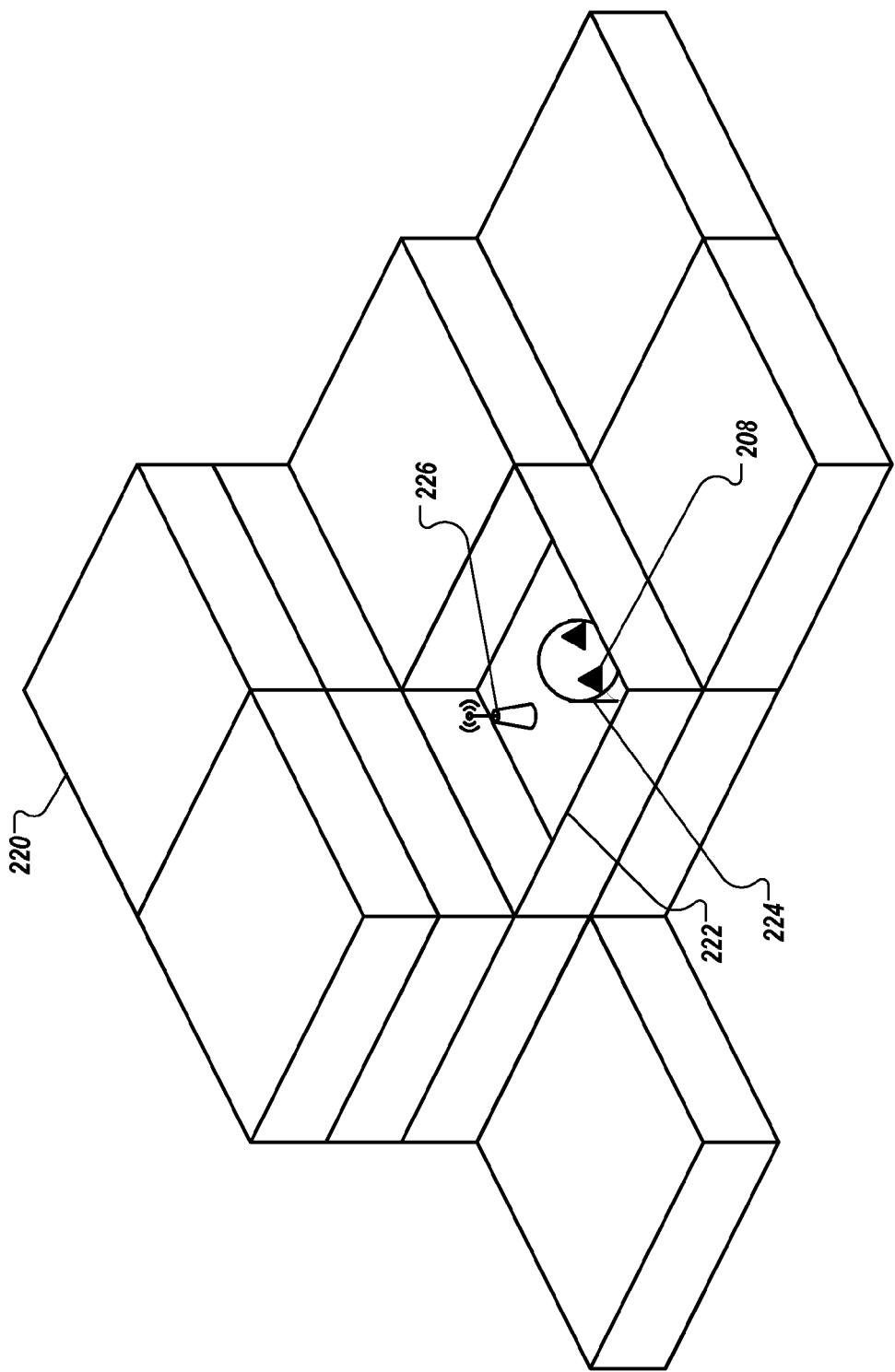

FIGS. 2A-2B illustrate example techniques of determining an access point location from one or more raw locations. For convenience, the techniques will be described in reference to a system that implements the techniques.

FIG. 2A is an overview of techniques of determining an access point location from one or more raw locations. A WLAN can be a radio communications network that includes a number of access points 205, 205a, and 205b. Each of access points 205, 205a, and 205b can include a hardware device or computer software that can act as a communication hub for wireless devices to connect to a wired network. Multiple access points 205, 205a, and 205b can be distributed in an area (e.g., an office building or an airport).

Access point 205 can communicate with wireless devices (e.g., mobile devices 208 and 210) using various communication protocols. In some implementations, access point 205 can be an access point of a WiFi™ network, which implements an Institute of Electrical and Electronics Engineers (IEEE) 802.xx based protocol (e.g., IEEE 802.11g). In some implementations, access point 205 can be an access point of a worldwide interoperability for microwave access (WiMAX) network, which implements an IEEE 802.16 based protocol (e.g., IEEE 802.16-2004 or IEEE 802.16e-2005). Access point 205 can have a communication range that can reach from location of access point 205 to anywhere from less than ten meters to several hundred meters depending on factors including configuration of access point 205 and physical surroundings. Multiple mobile devices 208 and 210 can connect to an access point when mobile devices 208 and 210 and the access point are located within a communication range of each other. Mobile devices 208 and 210 can select a particular access point 205 to which mobile devices 208 and 210 can connect based on various factors. For example, the selection can be based on whether mobile device 208 is authorized to connect to access point 205a, or whether access point 205a can provide the strongest signal or highest signal to noise ratio for the wireless connection to mobile device 208.

The system can determine access point locations 215, 215a, and 215b that are associated with access points 205, 205a, and 205b. Access point locations 215, 215a, and 215b can be calculated such that they indicate at what location mobile devices 208 connected to access points 215, 215a, and 215b, or are within communication range of access points 215, 215*a*, and 215*b*, respectively, are likely to be located. The system can make the determination based on raw locations received from mobile devices 208 that are connected to access points 205. Mobile devices 208 can be location-aware mobile devices, for example, GPS-enabled mobile devices that have built-in, or be coupled with, receivers that can receive GPS signals and determine locations using the GPS signals.

Location-aware mobile devices 208 are represented as black triangles in FIG. 2A. When location-aware mobile devices 208 are connected to a particular access point (e.g., access point 205*a*), location-aware mobile devices 208 can transmit the raw locations of the devices to access point 205*a*. Access point 205*a* can relay the transmission, as well as a location identifier of access point 205*a* (e.g., a MAC address of access point 205*a*), to the system. The system can determine an estimated access point location 215*a* where a mobile device 208 or 210 connected to access point 205*a* is most likely located. Mobile device 210, represented as white triangles in FIG. 2A, can be mobile devices that are not GPS-enabled.

To calculate access point locations 215, the system can apply an iterative process (e.g., by performing a multi-pass analysis). The iterative process can determine an access point location (e.g., access point location 215*a*) that is associated with an access point (e.g., access point 205*a*) as a circle. The circle can have a centroid that corresponds to an average geographic location calculated based on locations of location-aware mobile devices 208 that are wirelessly connected to access point 205. The circle can have a radius that corresponds to an error margin, which can be determined by, for example, a distance between a location of a mobile device 208 and the average geographic location. The iterative process can be executed periodically (e.g., every six hours) to capture different wireless access usage patterns during different hours of a day as well as to capture potential moves of access points 205.

The system can send information of access point locations 215 to mobile devices, including mobile devices that are not GPS-enabled (e.g., mobile device 210), such that the receiving mobile devices can determine estimated locations (e.g., WLAN locations) of the receiving mobile devices using access point locations 215. For example, if mobile device 210 is located within communication range of access points 205, 205*a*, and 205*b*, the WLAN location of mobile device 210 can be estimated by using access point locations 215, 215*a*, and 215*b*, which correspond to access points 205, 205*a*, and 205*b* respectively.

The server can selectively send one or more access point locations (e.g., access point locations 215, 215*a*, and 215*b*) to a mobile device (e.g., mobile device 210). Selectively sending access point locations to mobile device 210 can have an advantage of avoiding storing access point locations that are located remote to mobile device 210 and are thus unlikely to be used to determine a WLAN location of mobile device 210. The server can send access point locations of access points that are not immediately within a communication range of mobile device 210, but are close enough to mobile device 210, such that there is a sufficient likelihood that mobile device 210 can move to a location where mobile device 210 can connect to these access points. To avoid sending a large amount of location data to mobile device 210, the system can filter access point locations 215 such that only the location data of a limited number of access points (e.g., access point 205*a*), rather than location data of every single access points that exists in the world, are transmitted to mobile device 210.

To filter access point locations 215 and access points 205, the system can create geographic grid 200 that contain one or more WLAN cells 202. WLAN cell 202 can be a polygon having a substantially rectangular shape, the polygon corresponding to a geographic area identifiable on geographic grid 200 by a latitude and a longitude of an identifying point of the geographic area (e.g., a center, or a corner), and a size (e.g., a length measured in degrees of longitude, and a width measured in degrees of latitude). Alternatively or additionally, WLAN cell 202 can be defined using a relative distances from a reference WLAN cell on a two-dimensional plane. Each WLAN cell 202 can be used as a container that can contain a certain number of locations.

For example, WLAN cell 202 can be a rectangle whose length is 0.0005 degrees meridian (approximately 56 meters) and whose width 0.0005 degrees latitude (width in meters can vary depending on the latitude). WLAN cell 202 can be configured to contain a number (e.g., three) of access point locations corresponding to access points. In some implementations, WLAN cell 202 can contain access point location 215 if the center of access point location 215 is located within boundaries of WLAN cell 202. Access point locations 215 can be selected from all access point locations 215 that are located in WLAN cell 202 based on one or more reliability factors.

A particular access point (e.g., access point 205*b*) and the access point location associated with the access point (e.g., access point location 215*b*) need not be located in a same WLAN cell 202. This can happen, for example, when access point 205*b* is located in a building in WLAN cell 202*a* and most mobile devices 208 connected to access point 205*b* are located in another building in WLAN cell 202*b*. In some implementations, the system can ignore the actual location of access point 205*b*.

When mobile device 210 connects to an access point (e.g., access point 205*a*, whose associated access point location 215*a* is located in WLAN cell 202*c*), mobile device 210 can receive a location update from the system. The location update can include all access point locations 215 that are located in the same cell where access point location 115*a* is located (e.g., WLAN cell 202*c*). The location update can further include access point locations 215 that are located in other WLAN cells (e.g., WLAN cell 202*a* and WLAN cell 202*b*) that are neighbors to WLAN cell 202*c* on geographic grid 200.

When mobile device 210 connects to access point 205*a*, mobile device 210 can detect other access points 205 (e.g., access point 205*b*) that are located within communication range of mobile device 210. Mobile device 210 can identify access point locations (e.g., access point locations 215*a* and 215*b*) of the available access points. Mobile device 210 can calculate a WLAN location of mobile device 210 using various algorithms. For example, when only one access point location 215*a* is identified, mobile device 210 can designate access point location 215*a* as the WLAN location of mobile device 210.

When two or more access point locations 215 are identified, mobile device 210 can calculate its WLAN location using an iterative process (e.g., a multi-pass analysis). The iterative process can calculate an average geographic location of the access point locations, calculate distances between the access point locations and the average geographic location, and exclude access point locations that are the farthest away from the average location. Mobile device 210 can repeat the iterations until an accuracy requirement is satisfied for determining a location of mobile device 210. Mobile device 210 can designate the average location as a current location of mobile device 210 and display the average location on a map display device.

In some implementations, the location update received on mobile device 210 from the system can include numerous neighboring cells such that a sufficiently large area (e.g., one or two square kilometers) around access point location 215a can be covered. Based on the location update that covers the large area, mobile device 210 can avoid having to request frequent updates when mobile device 210 moves. Mobile device 210 can have opportunities to receive updated access point location information when, for example, mobile device 210 is idle or otherwise has available communication bandwidth.

FIG. 2B illustrates example techniques of determining an access point location from one or more raw locations in a three-dimensional space. Some location-aware mobile devices 208 (e.g., GPS-enabled devices) can identify locations in a three-dimensional space. The locations can be represented by latitudes, longitudes, and altitudes. Altitudes can be expressed, for example, as elevation measured as a distance (e.g., in meters) from sea level. Locating a mobile device in a three-dimensional space can be desirable when an altitude of the mobile device is used to locate the mobile device. For example, altitude can be used to determine on which floor the mobile device is located in a high-rise building. Location of mobile device 208 in three-dimensional space can be displayed on a two-dimensional map with the elevation as an annotation, or on a three-dimensional map.

Mobile devices 208 can connect to access point 226. Mobile devices 208 can be location-aware mobile devices that can transmit their locations, including latitude, longitude, and altitude coordinates to the system. The system can calculate an average geographic location based on the latitude, longitude, and altitude coordinates received from mobile devices 208. Three-dimensional space 224, having the average location as a center and an error margin as a radius, can be associated with access point 226. Space 224 can represent a space that a mobile device is likely to be located when the mobile device is connected to access point 226. In this specification, space 124 will be referred to as an access point space.

The system can send information on access point space 224 to mobile devices that request the information. The mobile devices receiving the information can use the information to determine their WLAN locations in the three-dimensional space. The system can divide the three-dimensional geographic space into three-dimensional grid 220. Three-dimensional grid 220 can include three-dimensional WLAN cells 222. Each three-dimensional WLAN cell 222 can have a base that corresponds to a two-dimensional WLAN cell (e.g., WLAN cell 202) of geographic grid 200. Each three-dimensional cell 222 can have a height (e.g., measured in meters) as a dimension. Access point space 224 can be referred to as being located in WLAN cell 222 if the center of access point space 224 is include in WLAN cell 222.

The system can transmit information on access point space 224 and neighboring access point spaces based on three-dimensional WLAN cells 222 of three-dimensional grid 220 to a mobile device (e.g., mobile device 210). Mobile device 210 can use the information to estimate a WLAN location of mobile device 210 in the three-dimensional space, and display the estimated current location on a three-dimensional map.

Example Client-Side System and Process of Location Determination

Figure 3A:
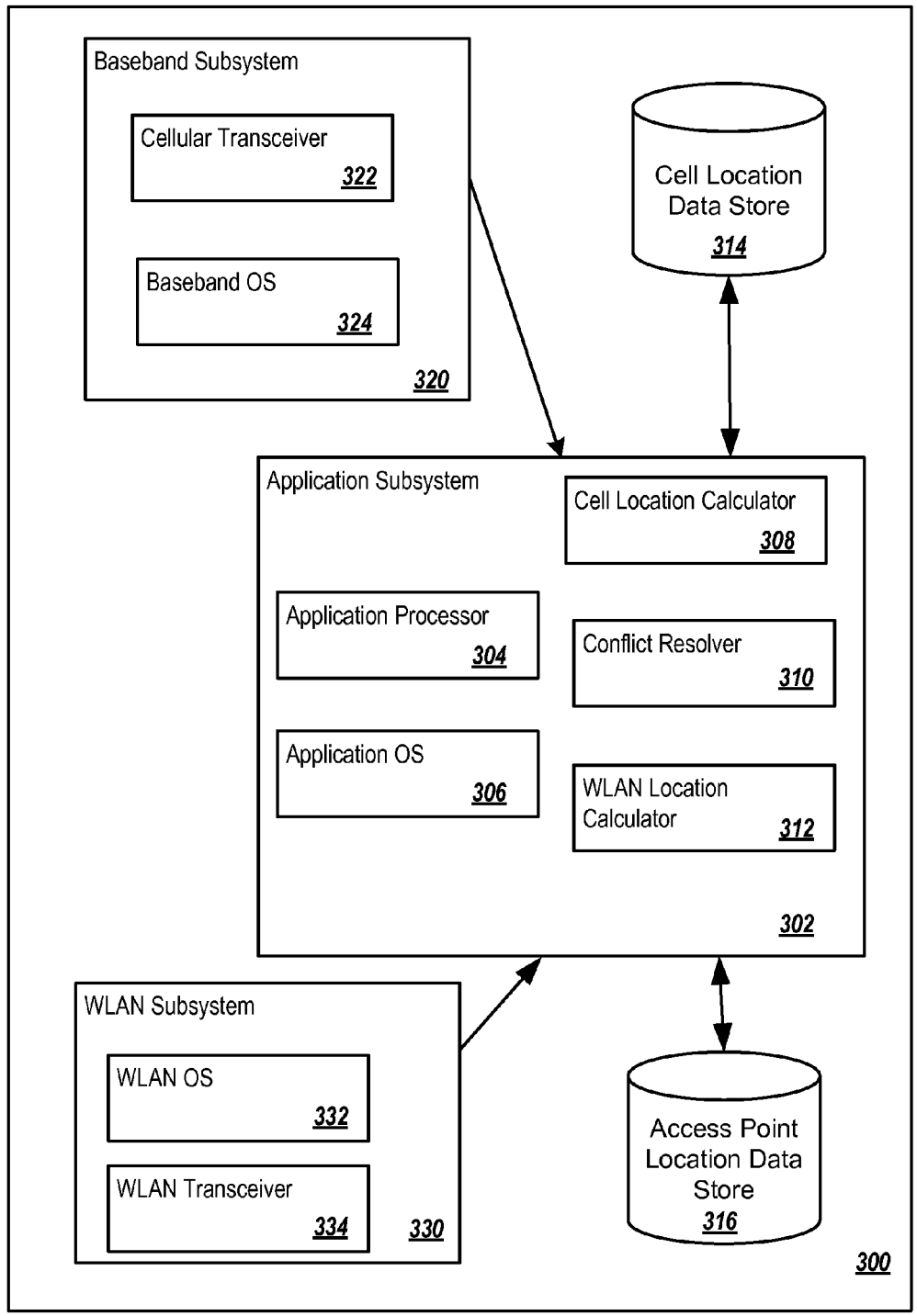
FIG. 3A is a block diagram illustrating various subsystems of an example mobile device implementing techniques of selective location determination.

FIG. 3A is a block diagram illustrating various subsystems of example mobile device 300 implementing techniques of selective location determination. Mobile device 300 can be a mobile device such as mobile device 100 of FIG. 1. Mobile device 300 can include application subsystem 302, baseband subsystem 320, and WLAN subsystem 330. Application subsystem 302 can be configured to perform traditional computer functions, such as executing application programs, storing various data, and displaying digital images. Application subsystem 302 can include application processor 304 and application operating system 306.

Baseband subsystem 320 can include a baseband processor, cellular transceiver 322, and baseband operating system 324 that manages various functions of baseband subsystem 320. Baseband subsystem 320 can be configured to monitor a current cell ID. Monitoring a current cell ID can include detecting that a current cell ID has changed. Baseband subsystem 320 can notify application subsystem 320 when a current cell ID changes. Baseband subsystem 320 can be configured to submit the current cell ID to application subsystem 302 upon receiving a request from application subsystem 302.

When application subsystem 302 receives the current cell ID from baseband subsystem 320, application subsystem 302 can determine a cell location using cell location calculator 308. Cell location calculator 308 can query cell location data store 314 using the received current cell ID and retrieve a cell location associated with the received current cell ID. Cell location data store 314 can store cell locations, associating cell IDs, and associating confidence values. Cell location data store 314 can reside on mobile device 300, reside on a server remotely, or be distributed among various mobile devices and servers.

If cell location calculator 308 fails to retrieve a cell location corresponding to the received current cell ID, cell location calculator 308 can request an update from a remote server through a communication network using a cell information update request. The request can include the received current cell ID, and can be made through data communication functions of baseband subsystem 320 or data communication functions of WLAN subsystem 330. If the server fails to respond, or the response fails to identify a cell location corresponding to the received current cell ID, mobile device 300 can determine a current location using a WLAN location. For example, mobile device 300 can provide an empty value as the cell location; the empty cell location can have a confidence value of zero.

WLAN subsystem 330 can include a WLAN processor, wireless transceiver 334, and WLAN operating system 332 that manages various functions of WLAN subsystem 330. WLAN subsystem 330 can be configured to scan wireless communication channels to detect access points that are located within a communication range of mobile device 300. Detecting the access points can include detecting MAC addresses associated with the access points. WLAN subsystem 330 can be configured to submit the detected MAC addresses to application subsystem 302 upon receiving a request from application subsystem 302.

When application subsystem 302 receives the MAC addresses from WLAN subsystem 330, application subsystem 302 can determine a WLAN location using WLAN location calculator 312. WLAN location calculator 312 can query access point location data store 316 using the received MAC addresses, and retrieve one or more access point locations (e.g., access point locations 124, 126, 128, and 130 shown in FIG. 1). Access point location data store 316 can store access point locations associated with the MAC addresses. Access point location data store 316 can reside on mobile device 300, reside on a server remotely, or be distributed among various mobile devices and servers.

If WLAN location calculator 312 fails to retrieve an access point location corresponding to a MAC address, point location calculator 312 can request an update from a remote server through a communication network using a cell information update request. The request can include the received MAC addresses, and can be made through data communication functions of baseband subsystem 320 or data communication functions of WLAN subsystem 330.

WLAN location calculator 312 can determine a WLAN location (e.g., WLAN location 112) of mobile device 300 using the access point locations retrieved from access point location data store 316. Determining the WLAN location can include triangulating the WLAN location from the access point locations. Alternatively or additionally, WLAN location calculator 312 can determine the WLAN location of mobile device 300 using an iterative process. The iterative process will be described below with respect to FIGS. 3B and 3C. Alternatively or additionally, WLAN location calculator 312 can determine a confidence value of the determined WLAN location.

Application subsystem 302 also includes conflict resolver 310. If the cell location determined using cell location calculator 308 conflicts with the WLAN location determined using access point location calculator 312, conflict resolver 310 can resolve the conflict using the confidence value associated with the cell location and the confidence value associated with the access point location. Conflict resolver 310 can select a location that has a higher confidence value as the current location of mobile device 300. If the cell location and the WLAN location has a same confidence value, conflict resolver 310 can select either the cell location or the WLAN location as the current location of mobile device 300.

Figure 3B:
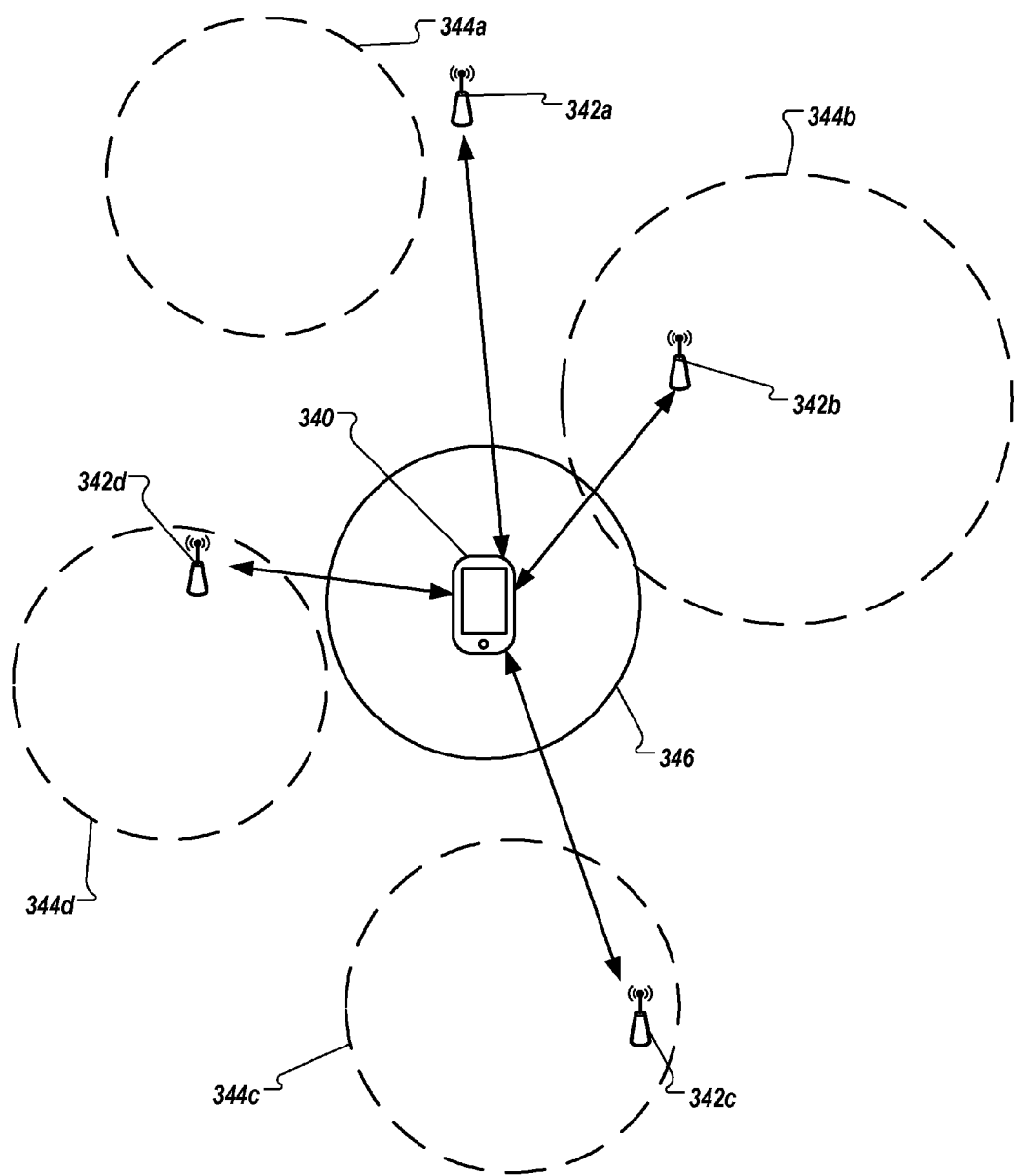
FIGS. 3B and 3C illustrate techniques for determining a WLAN location of an example mobile device using access point locations.

FIG. 3B provides an overview of techniques for determining a WLAN location of example mobile device 340 using access point locations. An example section of a wireless communications network that includes access points 342a-d is illustrated. Mobile device 340 can be a mobile device such as mobile device 100 of FIG. 1.

Mobile device 340 can be wirelessly connected to access point 342a. From access point 342a, mobile device 340 can receive data that includes information on access point locations (including access point locations 342a-d) or access point spaces of neighboring access points. Mobile device 340 can store the received data in a access point location data store (e.g., access point location data store 316). The access point location data store can be hosted on a storage device of mobile device 340. The stored data can be updated periodically or upon request.

In the example shown, mobile device 340 is connected to access point 342a. In addition, mobile device 340 is located within communication ranges to access points 342b, 342c, and 342d. Mobile device 340 can identify access points 342a, 342b, 342c, and 342d using a wireless communication protocol of the WLAN (e.g., IEEE 802.11g). Access points 342a-d can be identified by MAC addresses of the access points or other identifiers.

Mobile device 340 can identify access point locations 344a-d that are associated with access points 104, 106, 108, and 110, respectively. Identifying access point locations 344a-d can include retrieving the access point locations 344a-d from access point data store 316. In some implementations, mobile device 340 can request from a server the access point locations 344a-d by sending to the server identifiers of access points 342a-d.

Based on access point locations 342a-d, mobile device 340 can execute an iterative process (e.g., a multi-pass analysis) on the access point locations 124, 126, 128, and 130. The iterative process can produce WLAN location 346, which can be an estimate of a current geographic location of mobile device 340. WLAN location 346 can be a geographic space when three-dimensional location information is utilized.

Figure 3C:
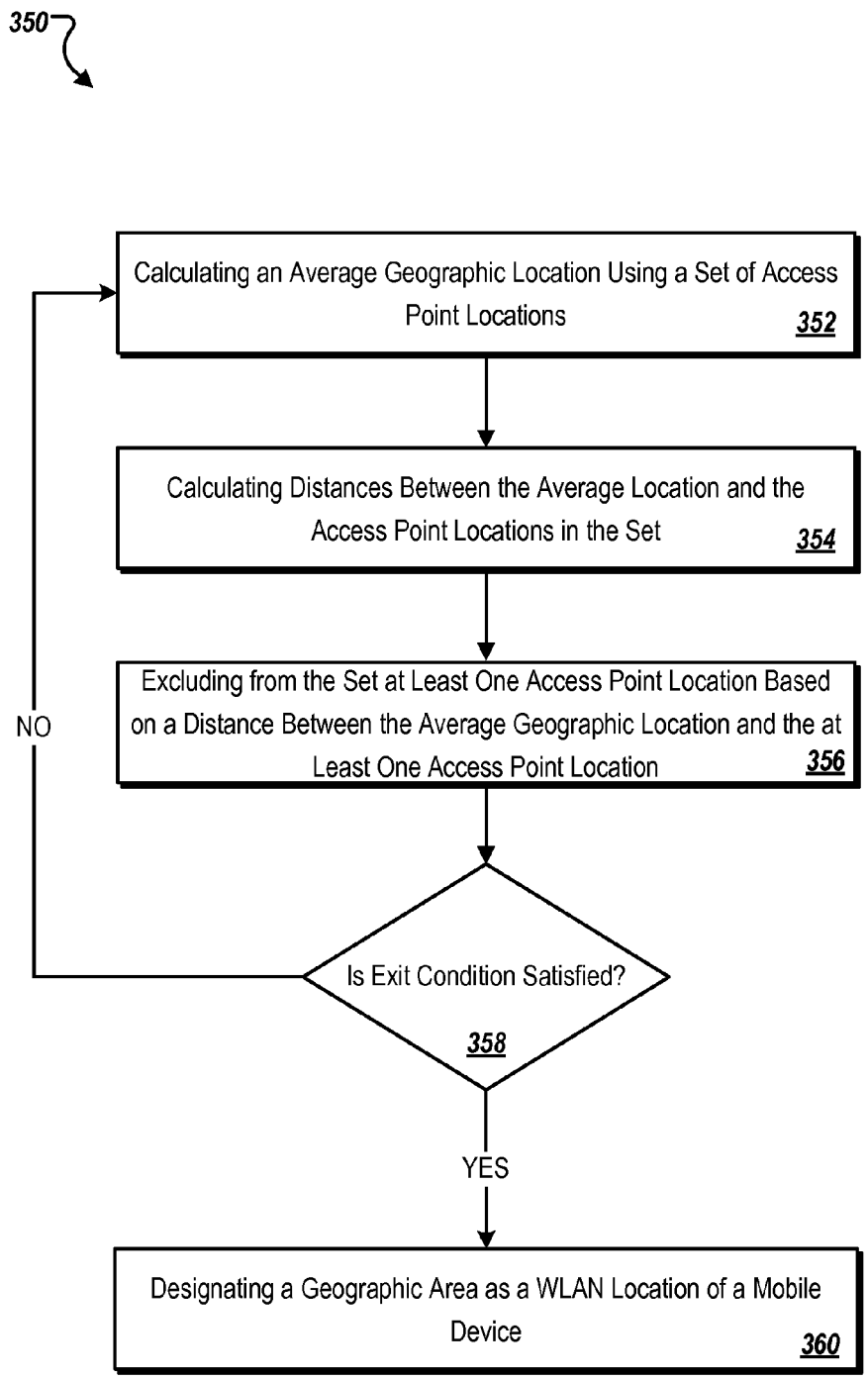

FIG. 3C is a flowchart illustrating example process 350 of determining a WLAN location of mobile device 100. Mobile device 100 can determine the WLAN location using a set of access point locations (e.g., access point locations 124, 126, 128, and 130) retrieved from access point location data store 316.

Mobile device 100 can calculate (352) an average geographic location using the access point locations in the set of access point locations. Calculating the average geographic location can include calculating an average of latitudes, longitudes, and altitudes of the access point locations in the set, and designating a point specified by the calculated average latitude, longitude, and altitude as the average geographic location. In some implementations, calculating the average geographic location can include designating a point specified by a median latitude, median longitude, and median altitude of the access point positions in the set as the average geographic location.

Mobile device 100 can calculate (354) distances between the access point locations in the set and the average geographic location. In some implementations, mobile device 100 can calculate a linear distance between each of the access point locations in the set and the average geographic location in Euclidean space. In some implementations, mobile device 100 can calculate a geodesic distance between each of the access point locations in the set and the average geographic location, taking curvature of the earth into consideration.

The distances calculated in stage 354 can be represented as a radius associated with a centroid. The centroid can be the average geographic location calculated in stage 352, which can be a center of a circle. The radius of the circle can be determined based on at least one distance between an access point location in the set of access point locations and the average geographic location. In some implementations, the radius can equal to the longest distance between the average geographic location and an access point location in the set. In some implementations, the radius can be a radius of a circle, such that, when the circle is drawn using the radius and the average geographic location as a center, the circle can enclose a specified percentage (e.g., 80 percent) of the access point locations in the set. The radius can represent a margin of error beyond which an estimation of a location of a mobile device that is not GPS-enabled is unlikely to be statistically meaningful.

Mobile device 100 can exclude (356) from the set at least one access point location based on a distance between the average location and the access point location. In some implementations, mobile device 100 can exclude access point locations whose distances to the average geographic location exceed a threshold distance. In each pass of the multi-pass analysis, the system can increase an accuracy of the estimated average geographic location by excluding access point locations that appear to be located far away from a concentration (e.g., a cluster) of access point locations. An access point location that is located far away from a cluster of locations can be less useful in estimating the WLAN location, and can be excluded.

In various implementations, the threshold distance can vary from one pass to a next pass. In some implementations, the threshold distance can be a distance to the average geographic location within which a certain percentage (e.g., 95 percent) of locations in the set are located. In some implementations, the threshold distance can be a value that varies with each pass (e.g., 250 meters for the first pass, 150 meters for the second pass, etc.). Mobile device 100 can exclude at least one access point location from the set when the distance between the average geographic location and the access point location exceeds the threshold distance.

Mobile device 100 can repeat stages 352, 354, and 356 of process 350 until an exit condition is satisfied. The system can determine (358) whether an exit condition is satisfied for terminating the repetition. In some implementations, the exit condition can be satisfied when a number of repetitions reach a threshold number (e.g., 10 times). The threshold number, as well as the percentage of locations to exclude, can be configurable to fine tune a balance between certainty (e.g., a WLAN location having a larger area can result in more confidence that a mobile device in the cell is actually located at the WLAN location) and accuracy (e.g., a smaller presence area can result in more accurate location of a mobile device).

In some implementations, the exit condition of stage 358 can be satisfied when the WLAN location has an area that is sufficiently small. The repetition of stages 352, 354, and 356 can terminate when the radius of the WLAN location reaches below a threshold radius. For example, the threshold radius can be 8-10 meters.

Mobile device 100 can designate (360) a geographic area as a WLAN location of mobile device 100. The geographic area can be a circle having a center based on the average geographic location and a radius based on at least one calculated distance. The center can be represented in latitudes and longitudes. In some implementations where distances are calculated in three-dimensional spaces, the center can further be represented in an altitude.

Figure 3D:
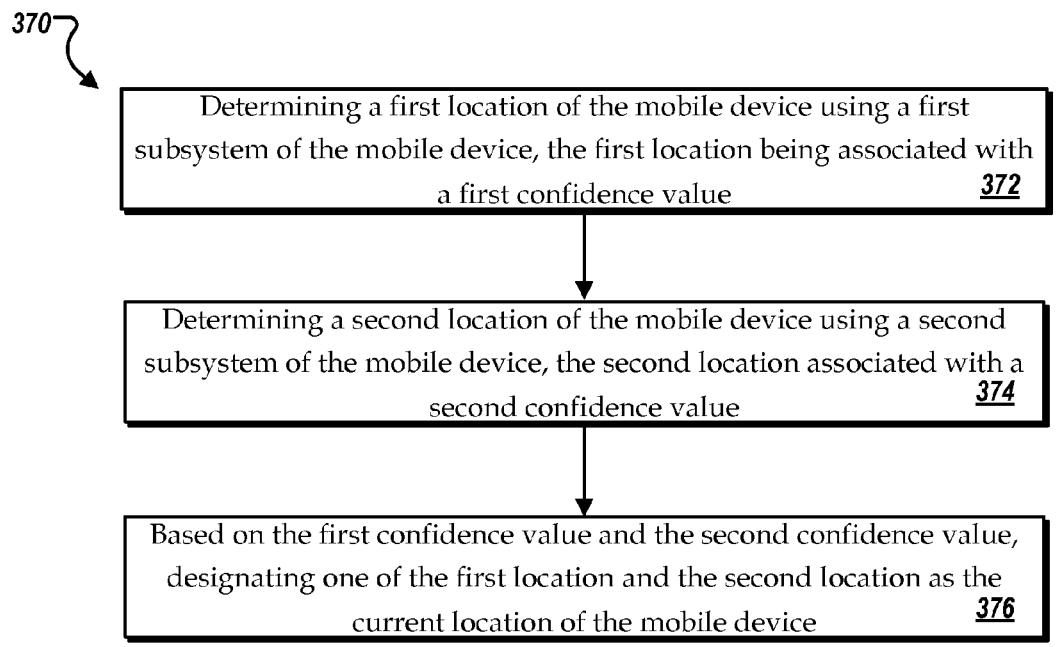
FIG. 3D is a flowchart illustrating an example process of selective location determination implemented on a mobile device.

FIG. 3D is a flowchart illustrating example process 370 of selective location determination implemented on mobile device 100.

Mobile device 100 can determine (372) a first location (e.g., a cell location) of mobile device 100 using a first location criterion. Determining the first location using the first location criterion can include determining the first location using a first subsystem (e.g., a baseband subsystem) of mobile device 100. The first location can be associated with a first confidence value. Determining the first location can include determining a cell ID of mobile device 100 using a baseband subsystem of the mobile device and identifying the first location from a first location data store (e.g., cell location data store 314) using the cell ID. The first location data store can store one or more cell IDs, one or more cell locations that correspond to the cell IDs, and one or more first confidence values that correspond to the cell locations. The first location data store, when hosted on mobile device 100, can be populated and updated by a push from the server, or by a pull responsive to a user request.

Mobile device 100 can determine (374) a second location (e.g., a WLAN location) of mobile device 100 using a second location criterion. Determining the second location using the second location criterion can include determining the second location using a second subsystem (e.g., a WLAN subsystem) of mobile device 100. The second location can be associated with a second confidence value. Determining the second location can include using the WLAN subsystem of mobile device 100 to detect one or more MAC addresses of one or more wireless access points located within a communication range of mobile device 100. Mobile device 100 can identify a set of access point locations from a second location data store (e.g., access point location data store 316) using the one or more MAC addresses. The second location data store can store the MAC addresses of the one or more wireless access points and the access point locations corresponding to the MAC addresses. Mobile device 100 can determine the second location using the set of access point locations. Determining the second location of mobile device 100 can include determining a WLAN location of mobile device 100 using example process 350 as described above with respect to FIG. 3C.

Determining the second confidence value (e.g., confidence value of the WLAN location) can include specifying a base confidence value. Mobile device 100 can calculate a number of identified access point locations and use the number of identified access point locations to determine the second confidence value.

Each of the first and second locations can include a latitude, a longitude, and optionally, an altitude coordinate.

Based on the first confidence value and the second confidence value, mobile device 100 can designate (376) one of the first location and the second location as the current location of mobile device 100. Designating one of the first location and the second location as the current location of mobile device 100 can include detecting a conflict between the first location and the second location. A conflict can occur when the first location does not overlap the second location. Mobile device 100 can determine that the first confidence value (e.g., the confidence value of the cell location) equals to or exceeds the second confidence value (e.g., the confidence value of the WLAN location). Upon the determining, mobile device 100 can designate the first location as the current location of mobile device 100. If the first confidence value does not equal to or exceed the second confidence value, mobile device 100 can designate the second location as the current location of mobile device 100.

Example Server-Side System and Process of Location Determination

Figure 4A:
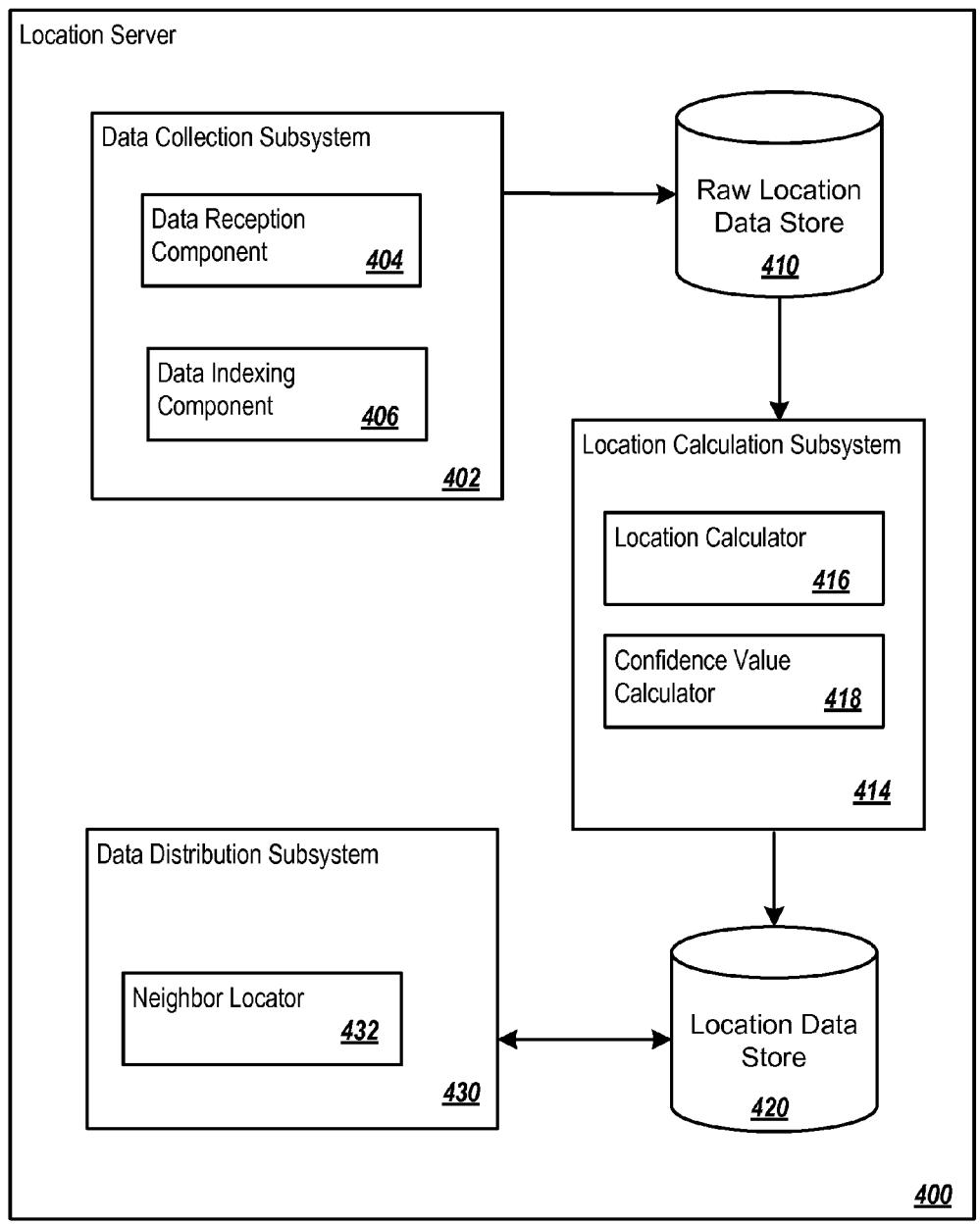
FIG. 4A is a block diagram illustrating an example server implementing techniques of selective location determination.

FIG. 4A is a block diagram illustrating an example server 400 implementing techniques of selective location determination. Server 400 can include one or more processors, one or more memory devices storing instructions and data, and other hardware or software components. Server 400 can determine access point locations associated with WLAN access points, cell locations associated with cell IDs, and confidence values of the cell locations. The determination can be made using various subsystems of server 400.

Server 400 can include data collection subsystem 402 that can receive data from various location-aware mobile devices. The data from a location-aware mobile device can include location identifiers (e.g., MAC addresses or cell IDs), and raw locations. A raw location can be associated to a location identifier, and indicate a location of the location-aware mobile device, as determined by the location-aware mobile device, when the location-aware mobile device was connected to, or was located in communication range of, a wireless access gateway (e.g., an access point or a cell tower) represented by the location identifier.

Data collection subsystem 402 can include data reception component 404, which can receive data transmitted from the location-aware mobile devices. Data collection subsystem 402 can include data indexing component 406. Data indexing component 406 can perform various processing on the received data points (e.g., raw locations and location identifiers). For example, data indexing component 406 can sort latitudes, longitudes, and altitudes based on cell IDs. Data indexing component 406 can also group data into sets based on time periods. For example, a new set of received locations can be created for a configurable period of time (e.g., six hours or one day) for a particular cell ID or a MAC address.

Data indexing component 406 can create sets of location identifiers and raw locations associated with the location identifiers, and store the set in raw location data store 410. Raw location data store 410 can store current and historical raw locations and location identifiers of various mobile devices 108. Raw location data store 410 can be implemented, for example, using an ad-hoc database, relational database, or object-oriented database. Raw location data store 410 can be hosted locally or remotely in relation to server 400.

Location server 400 can include location calculation subsystem 414 that can determine cell locations or access point locations to be associated with the location identifiers, and determine location confidence values to be associated with the locations. Location calculation subsystem 414 can include location calculator 416, which can be used to calculate an average geographic location in sets of data points (including raw locations for cell towers or access points) in raw location data store 410, calculate distances between the average geographic location and raw locations of various data points, and exclude raw locations from the sets for further computation.

The data points in raw location data store 410 can be grouped as various sets; each set can include one or more raw locations corresponding to a location identifier (e.g., a cell ID or a MAC address). Location calculator 416 can perform the calculations for each set (e.g., a set of raw locations associated with a cell ID), until an exit condition is reached for the set. Location calculator 416 can determine a cell location (including a cell space) for each cell ID, and an access point location (including an access point space) for each access point.

Location calculation subsystem 414 can include confidence value calculator 418. Confidence value calculator 418 can determine confidence values for each location (e.g., each cell location). The determination of confidence values can be based on population, stability, longevity, and freshness. The population, stability, longevity, and freshness can be determined based on data mined from raw location data store 410. For example, confidence value calculator 418 can determine freshness of a particular cell ID by identifying a last location update on the particular cell ID in raw location data store 410 (e.g., by checking timestamps of when raw locations associated with the cell ID were submitted).

Confidence value calculator 418 can include various rules for determining confidence values based on population, stability, longevity, and freshness. An example freshness based rule can provide that, for example, if the last raw location update for a cell ID occurred a threshold time ago (e.g., 90 days ago), the confidence value can be set to a first value (e.g., "50" on a 0-100 scale). An example population based rule can provide that if a number of raw locations for the cell ID satisfies a first threshold population (e.g., 100 raw locations for the cell ID are stored in raw location data store 410), the confidence value can be adjusted to a second value (e.g., "80" on a 0-100 scale). Another example population based rule can provide that if a number of raw locations for the cell ID satisfies a second threshold population (e.g., 25 raw locations for the cell ID are stored in raw location data store 410), the confidence value can be adjusted to a third value (e.g., "65" on a 0-100 scale). A third example population based rule can provide that if a number of raw locations for the cell ID does not satisfy a third threshold population (e.g., 25 raw locations for the cell ID are stored in raw location data store 410), the confidence value can be set to a third value (e.g., "50" on a 0-100 scale), regardless of the freshness the locations.

Locations determined by location calculation subsystem (e.g., the cell locations and access point locations), as well as the confidence values associated with the locations, can be stored in location data store 420. Location data store 420 can store the cell locations and access point locations using latitude, longitude, and optionally, altitude of the cell locations and access point locations. Location calculation subsystem 414 can update location data store 420 periodically (e.g., daily). Location data store 420 can include an access point location data store (e.g., access point location store 316 of FIG. 3A) and a cell location data store (e.g., cell location store data 314 of FIG. 3A).

Server 400 can distribute data stored in location data store 420 using data distribution subsystem 430. Data distribution subsystem 430 can send information of cell locations, access point locations, and corresponding confidence values to mobile devices (e.g., mobile device 100) upon request, through broadcasting, or using various push technology without receiving requests from the mobile devices. For example, data distribution subsystem 430 can push a new set of access point locations to mobile device 100 if mobile device 100 has traveled to a WLAN grid that can indicate that mobile device 100 will enter a geographic area that includes access points whose access point locations not already known to mobile device 100.

In some implementations, data distribution subsystem 430 can send multiple access point locations to mobile device 100 in a single transmission session. To reduce the number of access point location transmissions to the mobile device 100 (each of which can consume communication bandwidths of mobile device 100), data distribution subsystem 430 can use neighbor locator 432 to locate WLAN cells that neighbor the current WLAN cell in which mobile device 100 is located. Neighboring WLAN cells can include, for example, a number of WLAN cells surrounding the WLAN cell in which mobile device 100 is located such that the total area of the WLAN cell and the surrounding WLAN cells cover a geographic region that has a specified area (e.g., one or two squire kilometers).

Sending access point locations of access points in multiple WLAN cells (e.g., 400 WLAN cells) to mobile device 100 can moderate the number of transmissions when mobile device 100 moves across WLAN cells. In such implementations, data distribution subsystem 430 only needs to send an update to mobile device 100 when mobile device 100 moves or is about to move out of all WLAN cells whose access point locations have been previously sent to mobile device 100.

Figure 4B:
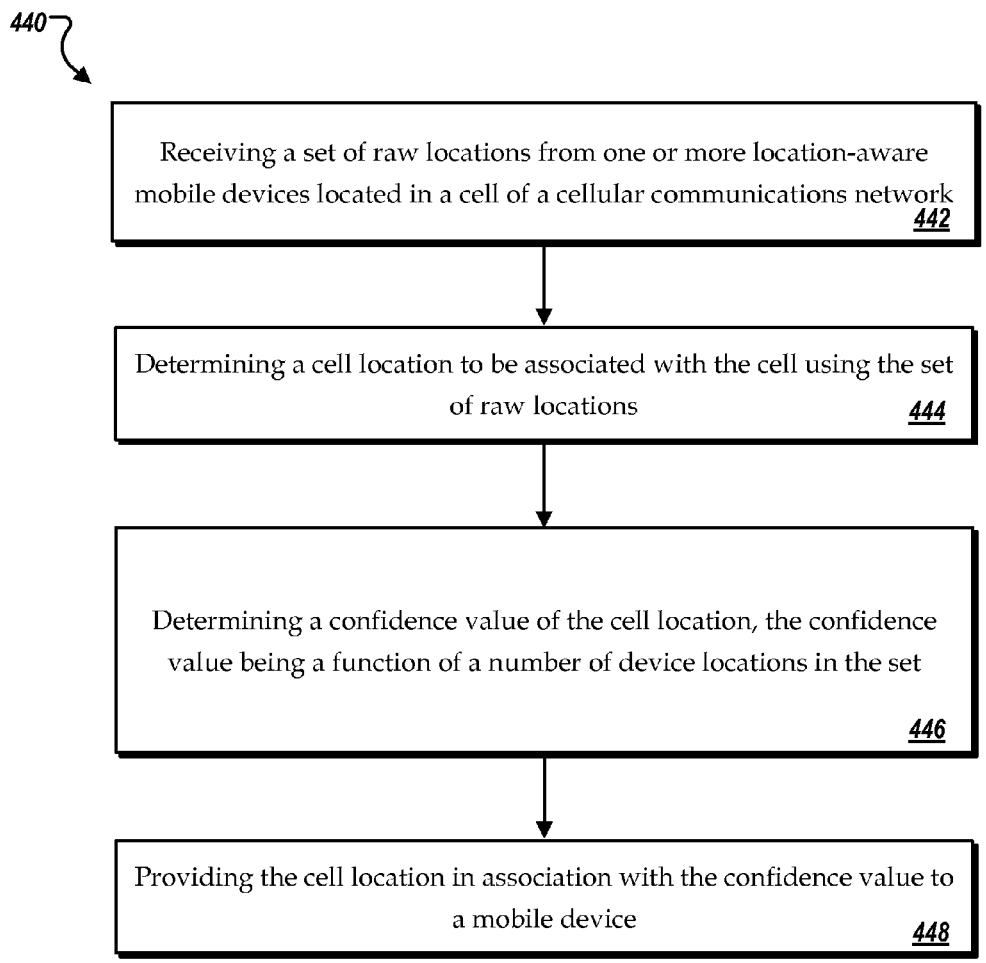
FIG. 4B is a flowchart illustrating an example process of selective location determination implemented on a server.

FIG. 4B is a flowchart illustrating example process 440 of selective location determination implemented on a server. For convenience, process 440 will be described in reference to server 400 that implements process 440.

Server 400 can receive (442) a set of raw locations from one or more location-aware mobile devices located in a cell of a cellular communications network. Each raw location can include a latitude, a longitude, and optionally, an altitude. The raw location can be associated with a location identifier (e.g., a cell ID of the cell).

Server 400 can determine (444) a cell location to be associated with the cell using the set of raw locations. Determining the cell location can include performing an iterative analysis of the raw cell locations, including multiple passes of averaging the raw locations and excluding outliers.

Server 400 can determine (446) a confidence value of the cell location, the confidence value can be based on a number of raw locations in the set of raw locations. In some implementations, the confidence value can be proportional to the number of raw locations in the set of raw locations. Determining the confidence value can include adjusting the confidence value based on a stability of the cell location, the stability including a length of time during which the cell location is substantially unchanged.

The cell location for a cell can vary, for example, at different hours of the day, or for different days of a week. The variance can reflect a usage pattern and location pattern of the location-aware mobile devices. For example, during commute hours, the raw locations submitted by the location-aware mobile devices can concentrate along highways. During business hours of weekdays, the raw locations can concentrate around office buildings. During weekends, the raw locations can have a dispersed pattern. The cell locations calculated based on the raw locations therefore can vary, if a cell location is calculated every six hours or each day. The variance of the cell locations; however, can generally be limited to within an area of a few kilometers (that corresponding to a communication range of a cell tower). The cell location, therefore, is substantially unchanged. The cell location can be stable when the cell location has changed, and the location change is within a specified tolerance range. The tolerance range can correspond to the communication range of the cell tower. The cell location can change substantially when a cell tower moves long distance (e.g., from northern California to southern California).

In some implementations, determining the confidence value can include adjusting the confidence value based on a freshness of the raw locations, the freshness including a length of time that has elapsed since a last raw location of the raw locations was received.

Server 400 can provide (448) the cell location in association with the confidence value to a mobile device (e.g., mobile device 100). Providing the cell location in association with the confidence value can include pushing the cell location association with the confidence value to mobile device in response to a change of confidence value.

Example User Interfaces of Selective Location Determination

Figure 5:
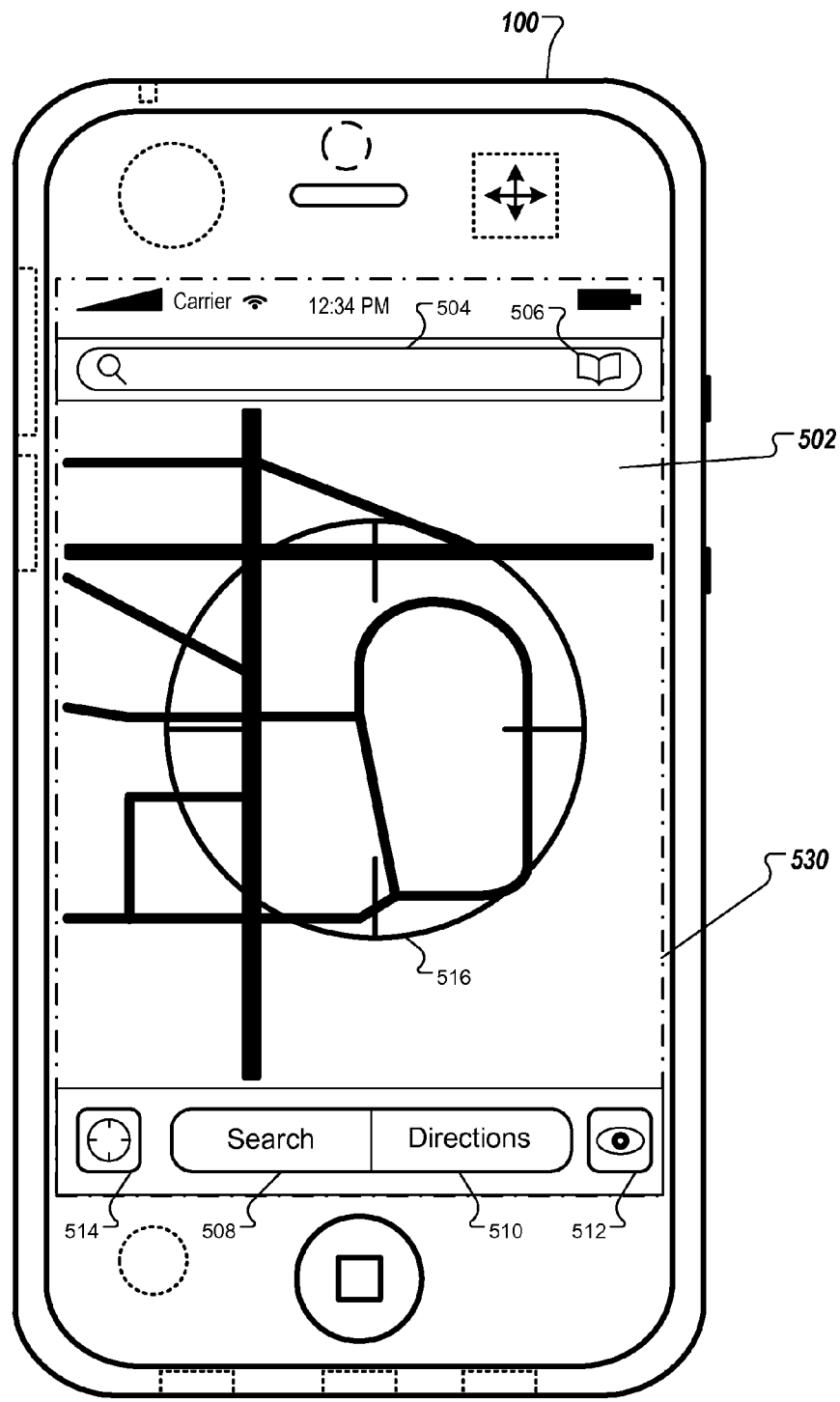
FIG. 5 illustrates an example user interface for selective location determination.

FIG. 5 illustrates an example user interface of selective location determination. In FIG. 5, example map 502 of a geographic area is displayed on mobile device 500. Mobile device 500 can be a mobile device such as mobile device 100 of FIG. 1. In some implementations, mobile device 500 can display map 502 on touch sensitive display 530 of mobile device 500. Map 502 can be displayed, for example, when a user selects a map object to view mapping and location based services. In some implementations, objects, such as a map object, can be selected by voice activation. Search bar 504 and bookmarks list object 506 can be displayed at the top of map 502. Below the bottom of the map one or more display objects can be displayed, for example, search object 508, directions object 510, map view object 512, and current location object 514.

Search bar 504 can be used to find an address or other location on the map. For example, a user can enter their home address in search bar 504, and the region containing the address would be displayed on map 502. Bookmarks list object 506 can, for example, bring up a Bookmarks list that contains addresses that are frequently visited, such as a user's home address. The Bookmarks list can also, for example, contain special bookmarks such as the current location (e.g. the current location of mobile device 500).

Search object 508 can be used to display search bar 504 and other map related search menus. Directions object 510 can, for example, bring up a menu interface that allows the user to enter a start and end location. The interface can then display information (e.g., directions and travel time for a route from the start location to the end location). Map view object 512 can bring up a menu that allows the user to select display options for map 502. For example, map 502 can be changed from black and white to color, the background of the map can be changed, or the user can change the brightness of the map.

Current location object 514 can allow the user to see geographic area 516 on map 502 indicating where device 500 is currently located. Geographic area 516 can correspond to a current location, determined using selective location determination techniques mobile device 500. A radius of geographic area 516 can be determined based on an error margin of a cell location (e.g., cell location 114 shown in FIG. 1), if mobile device selects cell location as the current location based on confidence value associated with cell location and an access point location (e.g., access point location 112 shown in FIG. 1).

The radius of geographic area 516 can be determined based on an error margin of the access point location, if mobile device selects access point location as the current location based on confidence values associated with the cell location and the access point location. A special current location bookmark can be placed in the Bookmarks list when the current location object 514 is selected. If the special current location bookmark was previously set in the Bookmarks list, the old bookmark information can, for example, be replaced with the new current location information.

In some implementations, the special current location bookmark can be tied to the centroid of geographic area 516. That is, the special current location bookmark can include the coordinates for the centroid of geographic area 516. Geographic area 516 can be based on location data determined or estimated using location instructions stored in a memory device of mobile device 500. Geographic area 516 can, for example, be depicted by a circle, rectangle, square, hexagon, or other enclosed region with crosshairs, or some other distinctive element to differentiate geographic area 516 from map 502.

In some implementations, geographic area 516 can indicate a region in which mobile device 500 is determined or estimated to be located, and the geographic area may not necessarily be centered on the actual current position of mobile device 500. In this example, mobile device 500 may be located off-center within the geographic area. In another example, geographic area 516 can be centered on an estimated current position of mobile device 500.

Mobile device 500 can, for example, center the map view on geographic area 516 when the current location object 514 is tapped or otherwise selected. In some implementations, the zoom level of map 502 can be adjusted based on the accuracy or precision of the location data or the technology, system, or service that provided the location data. For example, map 502 can be zoomed out when mobile device 500 cannot receive GPS signals for lower accuracy and uses access point data to determine its location. Map 502 can be zoomed in for higher accuracy if mobile device 500 is capable of using GPS location data to determine its current location. In some implementations, the zoom level can be based on the velocity of mobile device 500 (e.g., the map can be zoomed out at higher velocities and zoomed in when mobile device 500 is not moving). A combination of accuracy or precision and velocity can also be used.

If all methods for retrieving location-based data fail (e.g., when mobile device 500 is not within communication range of any access point, and does not have a current cell ID), and there are no other systems or services available for determining or estimating the current position of mobile device 500, an error can be displayed to the user and no geographic area is displayed on map 502. The error can, for example, contain a message to the user informing them of the failure and the possible reason or reasons for the failure.

Current location object 514 can be selected, for example, to activate the estimating and displaying of geographic area 516 on map 502, to get directions to or from the estimated current location (i.e., the centroid of geographic area 516), to send the estimated current location of mobile device 500 to a friend (e.g., such that the friend can go to the same location), or to create a bookmark for the estimated current location.

Example Server Architecture

Figure 6:
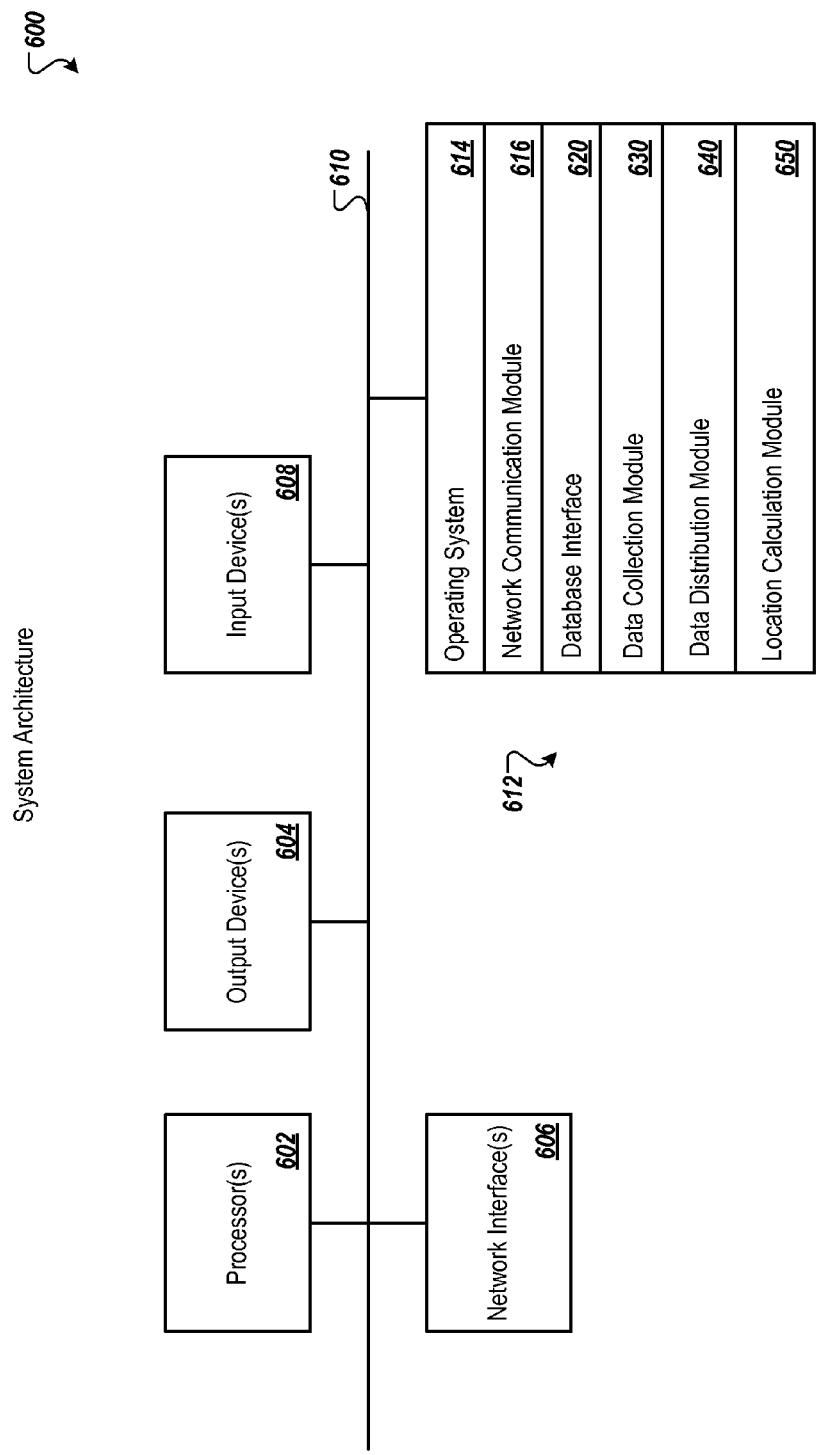
FIG. 6 is a block diagram of an example system architecture for implementing the features and operations of selective location determination on a server.

FIG. 6 is a block diagram of an example system architecture 600 for implementing the features and operations of selective location determination on a server. Other architectures are possible, including architectures with more or fewer components. In some implementations, architecture 600 includes one or more processors 602 (e.g., dual-core Intel® Xeon® Processors), one or more output devices 604 (e.g., LCD), one or more network interfaces 606, one or more input devices 608 (e.g., mouse, keyboard, touch-sensitive display) and one or more computer-readable mediums 612 (e.g., RAM, ROM, SDRAM, hard disk, optical disk, flash memory, etc.). These components can exchange communications and data over one or more communication channels 610 (e.g., buses), which can utilize various hardware and software for facilitating the transfer of data and control signals between components.

The term "computer-readable medium" refers to any medium that participates in providing instructions to processor 602 for execution, including without limitation, non-volatile media (e.g., optical or magnetic disks), volatile media (e.g., memory) and transmission media. Transmission media includes, without limitation, coaxial cables, copper wire and fiber optics.

Computer-readable medium 612 can further include operating system 614 (e.g., Mac OS® server, Windows® NT server), network communication module 616, database interface 620, data collection module 630, data distribution module 640, and location calculation subsystem 650. Data collection module 630, data distribution module 640, and location calculation subsystem 650 can be used to implement functions of data collection subsystem 402, data distribution subsystem 430, and location calculation subsystem 414, respectively, as described in reference to FIG. 4A. Operating system 614 can be multi-user, multiprocessing, multitasking, multi-threading, real time, etc. Operating system 614 performs basic tasks, including but not limited to: recognizing input from and providing output to devices 606, 608; keeping track and managing files and directories on computer-readable mediums 612 (e.g., memory or a storage device); controlling peripheral devices; and managing traffic on the one or more communication channels 610. Network communications module 616 includes various components for establishing and maintaining network connections (e.g., software for implementing communication protocols, such as TCP/IP, HTTP, etc.). Database interface 620 can include interfaces to one or more databases (e.g., raw location data store 410 and location data store 420) on a file system. The databases can be organized under a hierarchical folder structure, the folders mapping to directories in the file system.

Architecture 600 can be included in any device capable of hosting a database application program. Architecture 600 can be implemented in a parallel processing or peer-to-peer infrastructure or on a single device with one or more processors. Software can include multiple software components or can be a single body of code.

The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language (e.g., Objective-C, Java), including compiled or interpreted languages, and it can be deployed in any form, including as a stand-alone program or as a module, component, subroutine, a browser-based web application, or other unit suitable for use in a computing environment.

Suitable processors for the execution of a program of instructions include, by way of example, both general and special purpose microprocessors, and the sole processor or one of multiple processors or cores, of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network. The relationship of client and server arises by virtue of computer programs running on the respective computers and having a client-server relationship to each other.

Example Mobile Device Architecture

Figure 7:
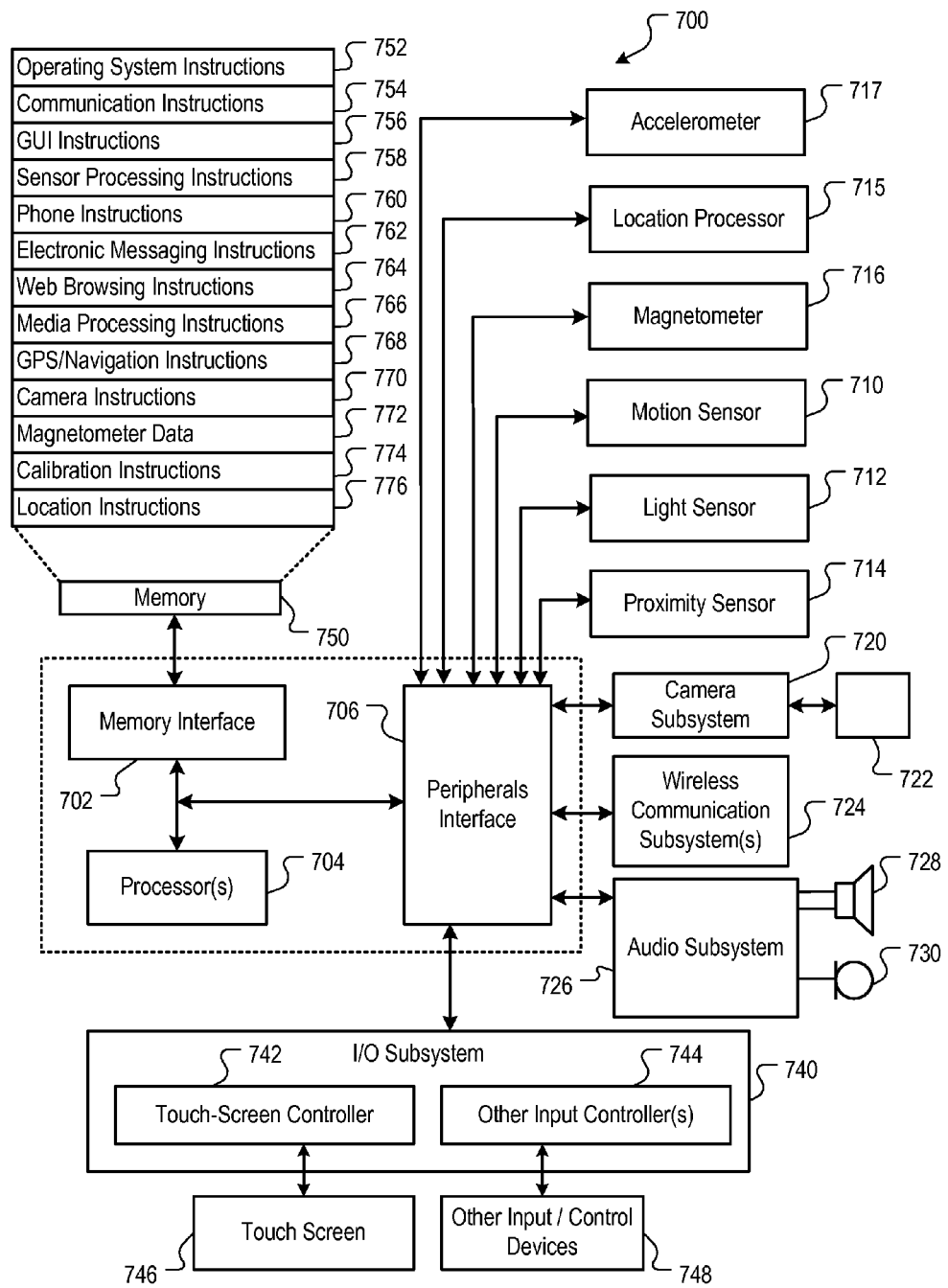
FIG. 7 is a block diagram of an example architecture of a mobile device implementing the features and operations of selective location determination.

FIG. 7 is a block diagram of an example architecture 700 of a mobile device implementing the features and operations of selective location. The mobile device (e.g., mobile device 100) can be, for example, a handheld computer, a personal digital assistant, a cellular telephone, an electronic tablet, a network appliance, a camera, a smart phone, an enhanced general packet radio service (EGPRS) mobile phone, a network base station, a media player, a navigation device, an email device, a game console, or a combination of any two or more of these data processing devices or other data processing devices.

The mobile device can include a memory interface 702, one or more data processors, image processors and/or central processing units 704, and a peripherals interface 706. The memory interface 702, the one or more processors 704 and/or the peripherals interface 706 can be separate components or can be integrated in one or more integrated circuits. The various components in the mobile device 100 can be coupled by one or more communication buses or signal lines.

Sensors, devices, and subsystems can be coupled to peripherals interface 706 to facilitate multiple functionalities. For example, motion sensor 710, light sensor 712, and proximity sensor 714 can be coupled to peripherals interface 706 to facilitate orientation, lighting, and proximity functions of the mobile device. Location processor 715 (e.g., GPS receiver) can be connected to peripherals interface 706 to provide geopositioning. Electronic magnetometer 716 (e.g., an integrated circuit chip) can also be connected to peripherals interface 706 to provide data that can be used to determine the direction of magnetic North. Thus, electronic magnetometer 716 can be used as an electronic compass. Accelerometer 717 can also be connected to peripherals interface 706 to provide data that can be used to determine change of speed and direction of movement of the mobile device.

Camera subsystem 720 and an optical sensor 722, e.g., a charged coupled device (CCD) or a complementary metal-oxide semiconductor (CMOS) optical sensor, can be utilized to facilitate camera functions, such as recording photographs and video clips.

Communication functions can be facilitated through one or more wireless communication subsystems 724, which can include radio frequency receivers and transmitters and/or optical (e.g., infrared) receivers and transmitters. The specific design and implementation of the communication subsystem 724 can depend on the communication network(s) over which the mobile device is intended to operate. For example, the mobile device may include communication subsystems 724 designed to operate over a GSM network, a GPRS network, an EDGE network, a Wi-Fi or WiMax network, and a Bluetooth network. In particular, the wireless communication subsystems 724 may include hosting protocols such that the device may be configured as a base station for other wireless devices.

Audio subsystem 726 can be coupled to a speaker 728 and a microphone 730 to facilitate voice-enabled functions, such as voice recognition, voice replication, digital recording, and telephony functions.

I/O subsystem 740 can include a touch screen controller 742 and/or other input controller(s) 744. Touch-screen controller 742 can be coupled to a touch screen 746 or pad. Touch screen 746 and touch screen controller 742 can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with touch screen 746.

Other input controller(s) 744 can be coupled to other input/control devices 748, such as one or more buttons, rocker switches, thumb-wheel, infrared port, USB port, and/or a pointer device such as a stylus. The one or more buttons (not shown) can include an up/down button for volume control of speaker 728 and/or microphone 730.

In one implementation, a pressing of the button for a first duration may disengage a lock of the touch screen 746; and a pressing of the button for a second duration that is longer than the first duration may turn power to the mobile device on or off. The user may be able to customize a functionality of one or more of the buttons. The touch screen 746 can, for example, also be used to implement virtual or soft buttons and/or a keyboard.

In some implementations, the mobile device can present recorded audio and/or video files, such as MP3, AAC, and MPEG files. In some implementations, the mobile device can include the functionality of an MP3 player, such as an iPod™. The mobile device may, therefore, include a pin connector that is compatible with the iPod. Other input/output and control devices can also be used.

Memory interface 702 can be coupled to memory 750. Memory 750 can include high-speed random access memory and/or non-volatile memory, such as one or more magnetic disk storage devices, one or more optical storage devices, and/or flash memory (e.g., NAND, NOR). Memory 750 can store operating system 752, such as Darwin, RTXC, LINUX, UNIX, OS X, WINDOWS, or an embedded operating system such as VxWorks. Operating system 752 may include instructions for handling basic system services and for performing hardware dependent tasks. In some implementations, operating system 752 can include a kernel (e.g., UNIX kernel).

Memory 750 may also store communication instructions 754 to facilitate communicating with one or more additional devices, one or more computers and/or one or more servers. Memory 750 may include graphical user interface instructions 756 to facilitate graphic user interface processing; sensor processing instructions 758 to facilitate sensor-related processing and functions; phone instructions 760 to facilitate phone-related processes and functions; electronic messaging instructions 762 to facilitate electronic-messaging related processes and functions; web browsing instructions 764 to facilitate web browsing-related processes and functions; media processing instructions 766 to facilitate media processing-related processes and functions; GPS/Navigation instructions 768 to facilitate GPS and navigation-related processes and instructions; camera instructions 770 to facilitate camera-related processes and functions; magnetometer data 772 and calibration instructions 774 to facilitate magnetometer calibration. Memory 750 can include location instructions 776 that can be used to determine a cell location of mobile device 100, determine a WLAN location of mobile device 100, and selecting one of the cell location and the WLAN location as a current location of mobile device 100. Memory 750 can also store other software instructions (not shown), such as security instructions, web video instructions to facilitate web video-related processes and functions, and/or web shopping instructions to facilitate web shopping-related processes and functions. In some implementations, the media processing instructions 766 are divided into audio processing instructions and video processing instructions to facilitate audio processing-related processes and functions and video processing-related processes and functions, respectively. An activation record and International Mobile Equipment Identity (IMEI) or similar hardware identifier can also be stored in memory 750.

Each of the above identified instructions and applications can correspond to a set of instructions for performing one or more functions described above. These instructions need not be implemented as separate software programs, procedures, or modules. Memory 750 can include additional instructions or fewer instructions. Furthermore, various functions of the mobile device can be implemented in hardware and/or in software, including in one or more signal processing and/or application specific integrated circuits.

Example Operating Environment

Figure 8:
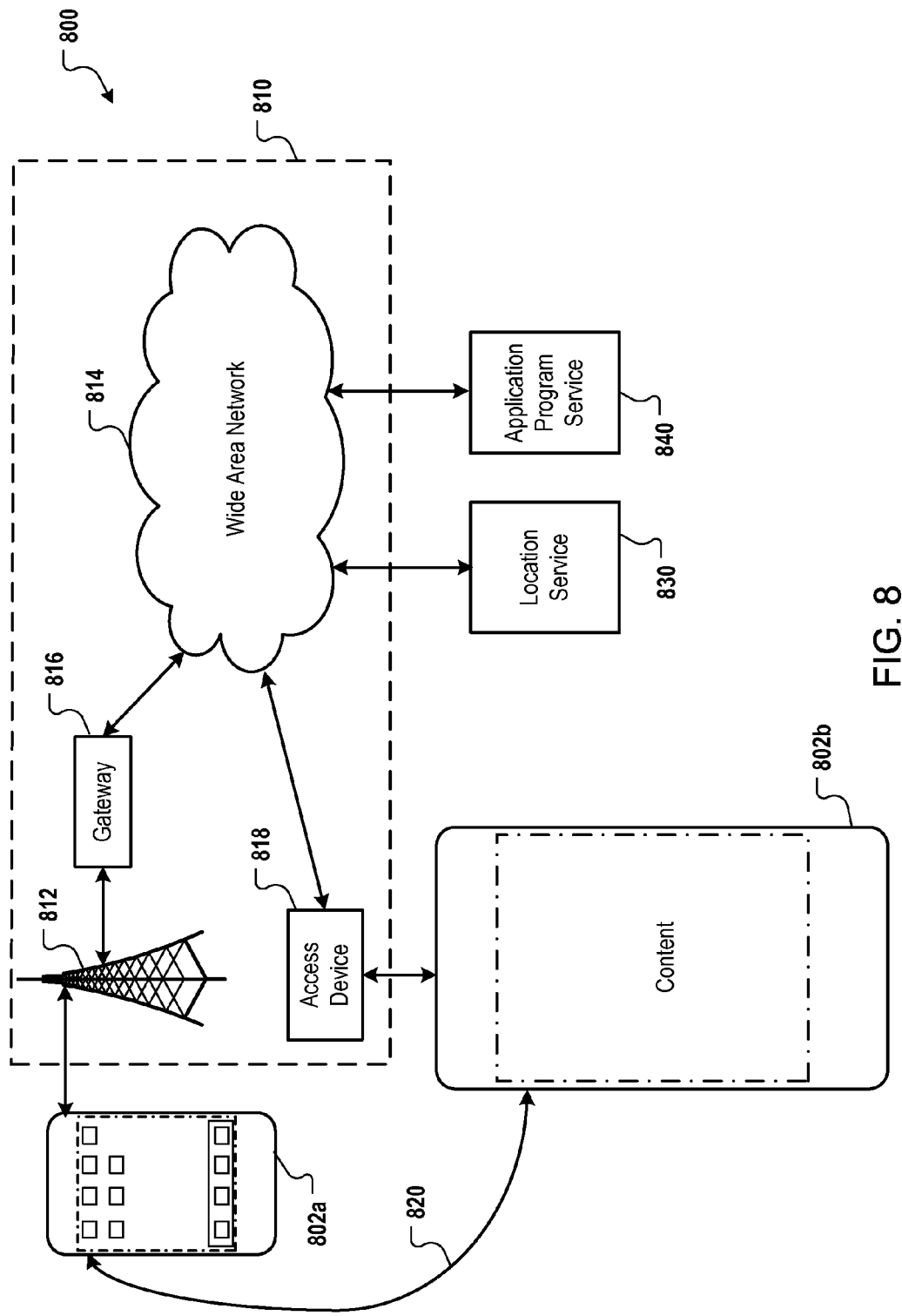
FIG. 8 is a block diagram of an example network operating environment for a mobile device implementing the features and operations of selective location determination.

FIG. 8 is a block diagram of an example network operating environment 800 for the mobile devices of FIGS. 1-7. Mobile devices 802a and 802b can, for example, communicate over one or more wired and/or wireless networks 810 in data communication. For example, a wireless network 812, e.g., a cellular network, can communicate with a wide area network (WAN) 814, such as the Internet, by use of a gateway 816. Likewise, an access device 818, such as an 802.11g wireless access device, can provide communication access to the wide area network 814.

In some implementations, both voice and data communications can be established over wireless network 812 and the access device 818. For example, mobile device 802a can place and receive phone calls (e.g., using voice over Internet Protocol (VoIP) protocols), send and receive e-mail messages (e.g., using Post Office Protocol 3 (POP3)), and retrieve electronic documents and/or streams, such as web pages, photographs, and videos, over wireless network 812, gateway 816, and wide area network 814 (e.g., using Transmission Control Protocol/Internet Protocol (TCP/IP) or User Datagram Protocol (UDP)). Likewise, in some implementations, the mobile device 802b can place and receive phone calls, send and receive e-mail messages, and retrieve electronic documents over the access device 818 and the wide area network 814. In some implementations, mobile device 802a or 802b can be physically connected to the access device 818 using one or more cables and the access device 818 can be a personal computer. In this configuration, mobile device 802a or 802b can be referred to as a "tethered" device.

Mobile devices 802a and 802b can also establish communications by other means. For example, wireless device 802a can communicate with other wireless devices, e.g., other mobile devices 802a or 802b, cell phones, etc., over the wireless network 812. Likewise, mobile devices 802a and 802b can establish peer-to-peer communications 820, e.g., a personal area network, by use of one or more communication subsystems, such as the Bluetooth™ communication devices. Other communication protocols and topologies can also be implemented.

The mobile device 802a or 802b can, for example, communicate with one or more services 830 and 840 over the one or more wired and/or wireless networks. For example, one or more location services 830 can determine locations associated with various location identifiers (e.g., cell IDs or MAC addresses) based on raw location data received from one or more location-aware mobile devices. The locations can be associated with confidence values, which can be calculated by mining the raw location data. The one or more location services 830 can provide the locations and confidence values to mobile devices.

Application program service 840 can, for example, provide application programs for download to mobile devices 802a and 802b. The application programs can include application programs that can provide location based services.

Mobile device 802a or 802b can also access other data and content over the one or more wired and/or wireless networks. For example, content publishers, such as news sites, Really Simple Syndication (RSS) feeds, web sites, blogs, social networking sites, developer networks, etc., can be accessed by mobile device 802a or 802b. Such access can be provided by invocation of a web browsing function or application (e.g., a browser) in response to a user touching, for example, a Web object.

A number of implementations of the invention have been described. Nevertheless, it will be understood that various modifications can be made without departing from the spirit and scope of the invention. For example, the location-aware devices are referred to as GPS-enabled. Location-aware mobile devices can also be based triangulation or other technology. WLAN cells are represents as substantially rectangular in shape in the figures. The actual shape of a WLAN cell can vary. Locations of a mobile device, when error margins are involved, are represented as circles in the figures. The actual shape of a location of the mobile device can have various geometric form (e.g., polygons, ellipses, or other shapes). WiFi™, WiMax, and cellular networks are used as examples. Other wireless technology (e.g., personal area network) can also be employed. Accordingly, other implementations are within the scope of the following claims.

What is claimed is:

1. A method for determining a current location of a mobile device, comprising:
   determining, by a first subsystem of the mobile device, a first location of the mobile device based on a location of a transceiver of a cellular network, the first subsystem configured to communicate with the transceiver of the cellular network, the first location being associated with a first confidence value, the first confidence value being determined based on a number of data points usable for determining the location of the transceiver;
   determining, by a second subsystem of the mobile device, a second location of the mobile device based on a set of one or more access point locations, the second subsystem of the mobile device configured to detect one or more access points in a wireless network, each of the one or more wireless access points corresponding to an access point location in the set, the second location being associated with a second confidence value, the second confidence value being determined by the mobile device based on a size of the set;
   determining that the first location conflicts with the second location; and based on the first confidence value and the second confidence value, designating one of the first location or the second location as the current location of the mobile device.

2. The method of claim 1, wherein the first subsystem of the mobile device is a baseband subsystem of the mobile device.

3. The method of claim 2, wherein determining the first location of the mobile device using the first subsystem includes:
   determining a cell identifier (cell ID) of the mobile device using the baseband subsystem of the mobile device;
   identifying a cell location from a first location data store using the cell ID, the first location data store configured to store one or more cell IDs, one or more cell locations that correspond to the cell IDs, and one or more first confidence values associated with the one or more locations; and
   designating the identified cell location as the first location.

4. The method of claim 1, wherein determining the second location of the mobile device using the second subsystem of the mobile device includes:
   detecting, by the second subsystem of the mobile device, one or more media access control (MAC) addresses of the one or more wireless access points located within a communication range of the mobile device;

identifying the set of access point locations from a second location data store using the one or more MAC addresses, the second data store storing the MAC addresses of the one or more wireless access points and the access point locations corresponding to the MAC addresses; and determining the second location using the set of access point locations.

5. The method of claim 4, wherein determining the second location of the mobile device comprises:

calculating an average geographic location using the identified set of access point locations;

calculating distances between the average geographic location and the access point locations in the set of access point locations;

excluding at least one access point location from the set of access point locations based on a distance between the average geographic location and the at least one access point location;

repeating each of calculating the average geographic location, calculating the distances, and excluding the at least one access point location until an exit condition is satisfied; and designating a geographic area as the second location of the mobile device, the geographic area having the average geographic location as a center and at least one calculated distance as an error margin.

6. The method of claim 5, wherein excluding the at least one access point location from the set of access point locations includes:

determining a threshold percentage of access point locations to be excluded; and excluding the threshold percentage of access point locations that are located farthest from the average geographic location.

7. The method of claim 5, wherein the exit condition is satisfied when a number of repetitions satisfies a threshold repetition number.

8. The method of claim 5, wherein:

the geographic area is a circle, the circle having a radius, the radius corresponding to the error margin; and the exit condition is satisfied when the radius of the circle satisfies a threshold radius.

9. The method of claim 4, wherein the second confidence value is determined further based on a specified base confidence value.

10. The method of claim 1, wherein each of the first and second locations includes a latitude coordinate, a longitude coordinate, and an altitude coordinate.

11. The method of claim 1, wherein:

detecting the first location conflicts with the second location comprises determining that the first location does not overlap the second location; and designating one of the first location or second location as the current location of the mobile device comprises designating one of the first location or second location that is associated with a higher confidence value as the current location.

12. A system, comprising:

a mobile device configured to perform operations for determining a current location of the mobile device, the operations comprising:

determining, by a first subsystem of the mobile device, a first location of the mobile device based on a location of a transceiver of a cellular network, the first subsystem configured to communicate with the transceiver of the cellular network, the first location being associated with a first confidence value, the first confidence value being determined based on a number of data points usable for determining the location of the transceiver;

determining, by a second subsystem of the mobile device, a second location of the mobile device based on a set of one or more access point locations, the second subsystem of the mobile device configured to detect one or more access points in a wireless network, each of the one or more wireless access points corresponding to an access point location in the set, the second location being associated with a second confidence value, the second confidence value being determined by the mobile device based on a size of the set;

determining that the first location conflicts with the second location; and based on the first confidence value and the second confidence value, designating one of the first location or the second location as the current location of the mobile device.

13. The system of claim 12, wherein determining the first location of the mobile device using the first subsystem includes:

determining a cell identifier (cell ID) of the mobile device using a baseband subsystem of the mobile device;

identifying a cell location from a first location data store using the cell ID, the first location data store storing one or more cell IDs, one or more locations that correspond to the cell IDs, and one or more first confidence values that correspond to the cell IDs; and designating the identified cell location as the current location of the mobile device.

14. The system of claim 12, wherein determining the second location of the mobile device using the second subsystem of the mobile device includes:

detecting, by the second subsystem of the mobile device, one or more media access control (MAC) addresses of the one or more wireless access points located within a communication range of the mobile device;

identifying the set of access point locations from a second location data store using the one or more MAC addresses, the second data store storing the MAC addresses of the one or more wireless access points and the access point locations corresponding to the MAC addresses; and determining the second location using the set of access point locations.

15. The system of claim 14, wherein determining the second location of the mobile device comprises:

calculating an average geographic location using the identified set of access point locations;

calculating distances between the average geographic location and the access point locations in the set of access point locations;

excluding at least one access point location from the set of access point locations based on a distance between the average geographic location and the at least one access point location;

repeating each of calculating the average geographic location, calculating the distances, and excluding the at least one access point location until an exit condition is satisfied; and designating a geographic area as the second location of the mobile device, the geographic area having the average geographic location as a center and at least one calculated distance as an error margin.

16. The system of claim 15, wherein excluding the at least one access point location from the set of access point locations includes:
   determining a threshold percentage of access point locations to be excluded; and
   excluding the threshold percentage of access point locations that are located farthest from the average geographic location.

17. The system of claim 15, wherein the exit condition is satisfied when a number of repetitions satisfies a threshold repetition number.

18. The system of claim 15, wherein:
   the geographic area is a circle, the circle having a radius, the radius corresponding to the error margin; and
   the exit condition is satisfied when the radius of the circle satisfies a threshold radius.

19. The system of claim 12, wherein the first subsystem of the mobile device is a baseband subsystem of the mobile device.

20. The system of claim 19, wherein the second confidence value is determined further based on a specified base confidence value.

21. The system of claim 12, wherein each of the first and second locations includes a latitude coordinate, a longitude coordinate, and an altitude coordinate.

22. The system of claim 12, wherein:
   detecting the first location conflicts with the second location comprises determining that the first location does not overlap the second location; and
   designating one of the first location or second location as the current location of the mobile device comprises designating one of the first location or second location that is associated with a higher confidence value as the current location.

23. A computer program product stored on a storage device, configured to cause a mobile device to perform operations of determining a current location of the mobile device, the operations comprising:
   determining, by a first subsystem of the mobile device, a first location of the mobile device based on a location of a transceiver of a cellular network, the first subsystem configured to communicate with the transceiver of the cellular network, the first location being associated with a first confidence value, the first confidence value being determined based on a number of data points usable for determining the location of the transceiver;
   determining, by a second subsystem of the mobile device, a second location of the mobile device based on a set of one or more access point locations, the second subsystem of the mobile device configured to detect one or more access points in a wireless network, each of the one or more wireless access points corresponding to an access point location in the set, the second location being associated with a second confidence value, the second confidence value being determined by the mobile device based on a size of the set;
   determining that the first location conflicts with the second location; and
   based on the first confidence value and the second confidence value, designating one of the first location or the second location as the current location of the mobile device.

24. The computer program product of claim 23, wherein the first subsystem of the mobile device is a baseband subsystem of the mobile device.

25. The computer program product of claim 24, wherein determining the first location of the mobile device using the first subsystem includes:
   determining a cell identifier (cell ID) of the mobile device using the baseband subsystem of the mobile device;
   identifying a cell location from a first location data store using the cell ID, the first location data store configured to store one or more cell IDs, one or more cell locations that correspond to the cell IDs, and one or more first confidence values associated with the one or more locations; and
   designating the identified cell location as the first location.

26. The computer program product of claim 23, wherein determining the second location of the mobile device using the second subsystem of the mobile device includes:
   detecting, by the second subsystem of the mobile device, one or more media access control (MAC) addresses of the one or more wireless access points located within a communication range of the mobile device;
   identifying the set of access point locations from a second location data store using the one or more MAC addresses, the second data store storing the MAC addresses of the one or more wireless access points and the access point locations corresponding to the MAC addresses; and
   determining the second location using the set of access point locations.

27. The computer program product of claim 26, wherein determining the second location of the mobile device comprises:
   calculating an average geographic location using the identified set of access point locations;
   calculating distances between the average geographic location and the access point locations in the set of access point locations;
   excluding at least one access point location from the set of access point locations based on a distance between the average geographic location and the at least one access point location;
   repeating each of calculating the average geographic location, calculating the distances, and excluding the at least one access point location until an exit condition is satisfied; and
   designating a geographic area as the second location of the mobile device, the geographic area having the average geographic location as a center and at least one calculated distance as an error margin.

28. The computer program product of claim 27, wherein excluding the at least one access point location from the set of access point locations includes:
   determining a threshold percentage of access point locations to be excluded; and
   excluding the threshold percentage of access point locations that are located farthest from the average geographic location.

29. The computer program product of claim 27, wherein the exit condition is satisfied when a number of repetitions satisfies a threshold repetition number.

30. The computer program product of claim 27, wherein:
   the geographic area is a circle, the circle having a radius, the radius corresponding to the error margin; and
   the exit condition is satisfied when the radius of the circle satisfies a threshold radius.

31. The computer program product of claim 26, wherein the second confidence value is determined further based on a specified base confidence value.

32. The computer program product of claim 23, wherein each of the first and second locations includes a latitude coordinate, a longitude coordinate, and an altitude coordinate.

33. The computer program product of claim 23, wherein:
detecting the first location conflicts with the second location comprises determining that the first location does not overlap the second location; and
designating one of the first location or second location as the current location of the mobile device comprises designating one of the first location or second location that is associated with a higher confidence value as the current location.

* * * * *